(12) United States Patent
Nomura et al.

(10) Patent No.: US 10,860,406 B2
(45) Date of Patent: Dec. 8, 2020

(54) INFORMATION PROCESSING DEVICE AND MONITORING METHOD

(71) Applicant: NEC Corporation, Tokyo (JP)

(72) Inventors: Takashi Nomura, Tokyo (JP); Koji Kida, Tokyo (JP); Junpei Kamimura, Tokyo (JP); Yoshiaki Sakae, Tokyo (JP); Etsuko Katsuda, Tokyo (JP); Kazuhiko Isoyama, Tokyo (JP); Kentaro Yamasaki, Tokyo (JP); Yuji Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/122,602

(22) PCT Filed: Mar. 18, 2015

(86) PCT No.: PCT/JP2015/001499
§ 371 (c)(1),
(2) Date: Aug. 30, 2016

(87) PCT Pub. No.: WO2015/141220
PCT Pub. Date: Sep. 24, 2015

(65) Prior Publication Data
US 2017/0075746 A1   Mar. 16, 2017

(30) Foreign Application Priority Data

Mar. 20, 2014   (JP) .................................. 2014-058496
Jun. 6, 2014    (WO) .................. PCT/JP2014/003014

(51) Int. Cl.
*G06F 11/00*   (2006.01)
*G06F 11/07*   (2006.01)
(Continued)

(52) U.S. Cl.
CPC ........ *G06F 11/079* (2013.01); *G06F 11/0721* (2013.01); *G06F 11/3006* (2013.01);
(Continued)

(58) Field of Classification Search
CPC .............. G06F 11/079; G06F 11/0721; G06F 11/3006; G06F 11/3024; G06F 11/3072;
(Continued)

(56) References Cited

U.S. PATENT DOCUMENTS 5,551,037 A * 8/1996 Fowler ................ G06F 11/3612
714/E11.212
7,065,537 B2 * 6/2006 Cha ..................... G06F 11/1471
707/648

(Continued)

FOREIGN PATENT DOCUMENTS

CN    102768638 A    11/2012
EP    0654735 A1    5/1995
(Continued)

OTHER PUBLICATIONS

Extended European Search Report issued by the European Patent Office for European Application No. 15765282.7 dated Dec. 21, 2017 (10 pages).

(Continued)

*Primary Examiner* — Katherine Lin
(74) *Attorney, Agent, or Firm* — Wilmer Cutler Pickering Hale and Dorr LLP

(57) ABSTRACT

The present invention provides an information processing device that outputs information including the data transmission relationship between elements constituting an information processing system, the information indicating the state of the information processing system. The information processing device includes a graphing means for generating a relationship graph based on an event log indicating the
(Continued)

821 RELATIONSHIP GRAPH

| VERTEX IDENTIFIER | SIDE |
|---|---|
| P1 | P2;SEND、P3;SEND;RECEIVE |
| P2 | P1;RECEIVE、P3;RECEIVE |
| P3 | P1;SEND;RECEIVE、P2;SEND、P4;RECEIVE |
| P4 | P3;SEND | behavior of each of a plurality of processes operating in the system, the relationship graph having the processes as the vertices thereof and having the data transmission relationship between the vertices as the sides thereof; and a graph output means for outputting the generated relationship graph.

26 Claims, 25 Drawing Sheets

(51) Int. Cl.
  *G06F 11/34* (2006.01)
  *G06F 11/30* (2006.01)
  *G06F 11/32* (2006.01)
(52) U.S. Cl.
  CPC ...... *G06F 11/3024* (2013.01); *G06F 11/3072* (2013.01); *G06F 11/323* (2013.01); *G06F 11/3476* (2013.01); *G06F 11/3055* (2013.01); *G06F 2201/86* (2013.01); *G06F 2201/865* (2013.01); *G06F 2201/875* (2013.01)
(58) Field of Classification Search
  CPC . G06F 11/323; G06F 11/3476; G06F 11/3055
  See application file for complete search history.

(56) References Cited

U.S. PATENT DOCUMENTS

| | | | |
|---|---|---|---|
| 2005/0276610 | A1 | 12/2005 | Hirayama |
| 2008/0065928 | A1 | 3/2008 | Suzuki et al. |
| 2010/0080118 | A1* | 4/2010 | Yamauchi ........... H04L 43/0817 370/221 |
| 2011/0087924 | A1* | 4/2011 | Kandula ............. G06F 11/0709 714/26 |
| 2012/0127971 | A1* | 5/2012 | Isaksson ........... H04W 72/0446 370/337 |
| 2012/0136921 | A1* | 5/2012 | Samdadiya ......... G06F 11/3006 709/203 |
| 2012/0260236 | A1* | 10/2012 | Basak ................... G06F 11/323 717/132 |
| 2012/0265805 | A1 | 10/2012 | Samdadiya et al. |
| 2013/0232433 | A1 | 9/2013 | Krajec et al. |
| 2014/0019879 | A1 | 1/2014 | Krajec et al. |
| 2015/0026465 | A1* | 1/2015 | Cucinotta ........... H04L 63/0428 713/168 |

FOREIGN PATENT DOCUMENTS

| | | | |
|---|---|---|---|
| EP | 2508997 | A1 | 10/2012 |
| GB | 2398650 | A * | 8/2004 ......... G06F 13/4286 |
| JP | H07-191872 | A | 7/1995 |
| JP | 2005-339025 | A | 12/2005 |
| JP | 2008-021274 | A | 1/2008 |
| JP | 2008-065668 | A | 3/2008 |
| JP | 2012-221502 | A | 11/2012 |
| JP | 2013-054402 | A | 3/2013 |
| JP | 2014-010772 | A | 1/2014 |

OTHER PUBLICATIONS

International Search Report corresponding to PCT/JP2015/001499, dataed Jun. 16, 2015, 2 pages.
Written Opinion of the International Search Authority corresponding to PCT/JP2015/001499 with English translations, dated Jun. 16, 2015, 12 pages.
Tanaka, Shinji, et al., "Performance Improvement of JavaVM for Network Platform", Technical Report of Institute of Electronics, Information and Communication Engineers, vol. 103, No. 576, the Institute of Electronics, Information and Communication Engineers, Jan. 15, 2004, pp. 31-35, ISSN: 0913-5685.
Kawai, Naoto, et al., "Updating Method of Control-metric Information for Relational-metric Based Operation in Communication Networks", Technical Report of Institute of Electronics, Information and Communication Engineers, vol. 114, No. 110, the Institute of Electronics, Information and Communication Engineers, Jun. 19, 2014, pp. 61-66, ISSN: 0913-5685.
Akashi, Osamu, et al., "IM-VIS: Inter-domain network-status visualization system based on information integration", Technical Report of Information Processing Society of Japan (IPSJ), SIG Notes, vol. 2009, No. 6, Information Processing Society of Japan, Jan. 21, 2009, pp. 75-82, ISSN: 0919-6072.
China's Notification of the Second Office Action issued in corresponding Chinese Patent Application No. 201580015249.2, dated Nov. 23, 2018, 20 pages.
Japanese Notice of Reasons for Refusal issued in Japanese Patent Application No. 2016-508538, dated May 7, 2019, 10 pages.
Naoto Kawai et al., "Updating Method of Control-metric Information for Relational-metric Based Operation in Communication Networks", Technical Report of IEICE, The Institute of Electronics, Information and Communication Engineers (IEICE), Jun. 19, 2014, vol. 114, No. 110, pp. 61-66 (6 pages).
Osamu Akashi, et al.,"IM-VIS: Inter-domain Network-status Visualization System Based on Information Integration", IPSJ SIG Technical Report, 2009-OS-110, Information Processing Society of Japan, Jan. 29, 2009, vol. 2009, No. 6, pp. 75-82 (8 pages).
Shinji Tanaka, et al., "Performance Improvement of Java VM for Network Platform", Technical Report of IEICE, The Institute of Electronics, Information and Communication Engineers (IEICE), Jan. 15, 2004, vol. 103, No. 576, pp. 31-35 (5 pages).
Japanese Notice of Reasons for Refusal issued in Japanese Patent Application No. 2016-508538, dated Dec. 17, 2019, 10 pages.

* cited by examiner

811 EVENT LOG

"P3" SENT REQUEST MESSAGE INCLUDING DATA TO "P4" AND
"P4" SENT RESPONSE MESSAGE INCLUDING DATA TO "P3"

821 RELATIONSHIP GRAPH

| VERTEX IDENTIFIER | SIDE |
|---|---|
| P1 | P2;SEND、 P3;SEND;RECEIVE |
| P2 | P1;RECEIVE、 P3;RECEIVE |
| P3 | P1;SEND;RECEIVE、 P2;SEND、 P4;RECEIVE |
| P4 | P3;SEND |

822 RELATIONSHIP GRAPH

| SIDE | ATTRIBUTE |
|---|---|
| P1—P2 | SEND |
| P1—P3 | SEND |
| P1—P3 | RECEIVE |
| P2—P3 | RECEIVE |
| P3—P4 | RECEIVE |

824 RELATIONSHIP GRAPH

| VERTEX IDENTIFIER | SIDE |
|---|---|
| P1 | F1;READ、<br>P2;SEND/RECEIVE |
| P2 | P1;SEND/RECEIVE、<br>F2;READ/WRITE、<br>P3;GENERATE |
| P3 | F2;READ |

823 RELATIONSHIP GRAPH

| VERTEX IDENTIFIER | SIDE |
|---|---|
| P1 | P2;SEND[1], P3;SEND[3];RECEIVE[2] |
| P2 | P1;RECEIVE[1], P3;RECEIVE[1] |
| P3 | P1;SEND[2];RECEIVE[3], P2;SEND[1], P4;RECEIVE[2] |
| P4 | P3;SEND[2] |

825 NETWORK DIAGRAM RELATIONSHIP GRAPH

826 MATRIX RELATIONSHIP GRAPH

|    | P1 | P2 | P3 | P4 |
|----|----|----|----|----|
| P1 | 0  | 1  | 3  | 0  |
| P2 | 0  | 0  | 0  | 0  |
| P3 | 2  | 1  | 0  | 0  |
| P4 | 0  | 0  | 1  | 0  |

827 NETWORK DIAGRAM RELATIONSHIP GRAPH

828 MATRIX RELATIONSHIP GRAPH

|  | P1 | F1 | P2 | F2 | P3 |
|---|---|---|---|---|---|
| P1 | NL | READ | SEND/RECEIVE | NL | NL |
| P2 | SEND/RECEIVE | NL | NL | READ/WRITE | GENERATE |
| P3 | NL | NL | NL | READ | NL |

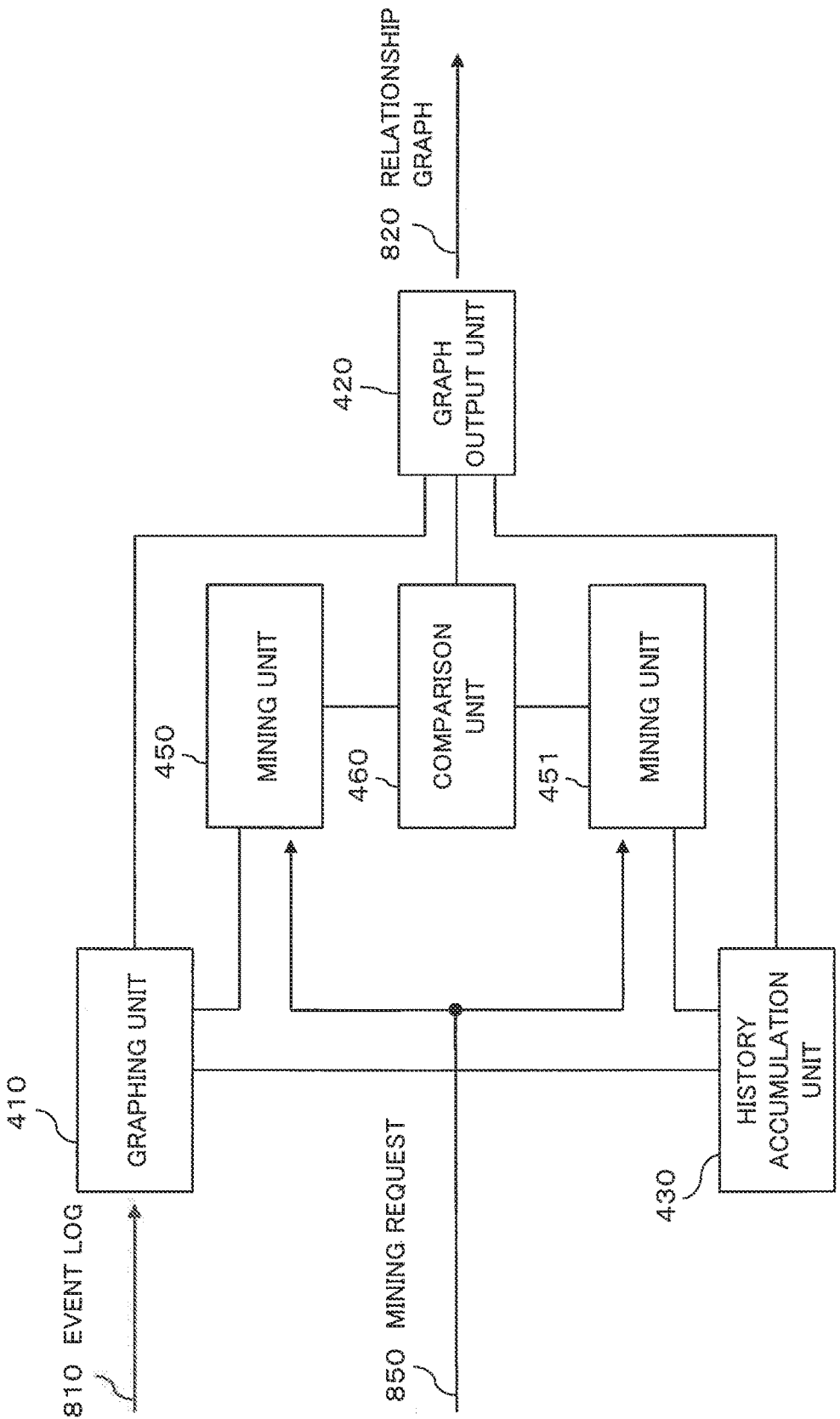

INFORMATION PROCESSING DEVICE AND MONITORING METHOD

CROSS-REFERENCE TO RELATED APPLICATIONS

This application is a national stage application of International Application No. PCT/JP2015/001499 entitled "INFORMATION PROCESSING DEVICE AND MONITORING METHOD," filed on Mar. 18, 2015, which claims the benefit of the priority of Japanese Patent Application No. 2014-058496 filed on Mar. 20, 2014 and PCT/JP2014/003014 filed on Jun. 6, 2014, the disclosures of each of which are hereby incorporated by reference in their entirety.

TECHNICAL FIELD

The present invention relates to a technique for monitoring an information processing system equipped with, for example, a computer, a server, a storage system, a communication control system, a terminal, or the like.

BACKGROUND ART

Various related-art techniques are known to monitor information processing systems.

For example, PTL 1 discloses a process monitoring device. The process monitoring device disclosed in PTL 1 operates in the following way.

First, the process monitoring device extracts an attention-requiring process based on static attributes for the process. Examples of the static attributes include a process name, a manufacturer's name of a program for implementing the process, the program (software) name, a version, a name of a parent process that activates the process, and a process size. The process monitoring device extracts a relevant process as the attention-requiring process in any of the following four cases: first, current static attributes are different from past static attributes; second, the past static attributes are unavailable; third, a parent process is unidentifiable; and fourth, an external process serves as the parent process.

Second, the process monitoring device issues an alarm for the attention-requiring process based on the dynamic attributes. Examples of the dynamic attributes include the number of dynamic dedicated memory bytes, the number of dynamic shared memory bytes, redirector sending, the reception traffic rate, and the hard disk access rate. When the past dynamic attributes may be discriminated from the current dynamic attributes by using any statistical method, the process monitoring device, for example, generates an alarm for the relevant attention-requiring process or registers it as a process to be monitored.

Third, the process monitoring device extracts an associated process having a predetermined relevance to the attention-requiring process and determines the associated process as a process to be monitored.

Examples of the process having the predetermined relevance include a process having a specific parent-child relation, and a process always activated when the process to be monitored operates, although not having a specific parent-child relation.

CITATION LIST

Patent Literature

[PTL 1] Japanese Unexamined Patent Application Publication No. 2008-021274

SUMMARY OF INVENTION

Technical Problem

However, in the above-described technique disclosed in Citation List, there is a problem such that it is difficult to output information which indicates the state of the information processing system including the data transmission relationship between elements constituting an information processing system.

This is because the technique disclosed in PTL 1 is used to individually detect processes respectively corresponding to an attention-requiring process, a process to be monitored, and a process which requires alarm generation. In other words, PTL 1 merely describes the relationship between processes in relation to the parent-child relationship and activation synchrony.

An object of the present invention is to provide an information processing device, a monitoring method, and a program therefor or a non-transitory computer-readable recording medium recording the program which solves the above-mentioned problem.

Solution to Problem

An information processing device according to an aspect of the present invention includes graphing means for generating a relationship graph based on an event log indicating a behavior of each of a plurality of processes operating in a system, the relationship graph including the processes as vertices thereof and including data transmission relationships between the vertices as sides thereof, and graph output means for outputting the relationship graph.

A monitoring method according to an aspect of the present invention includes generating a relationship graph based on an event log indicating a behavior of each of a plurality of processes operating in a system, the relationship graph including the processes as vertices thereof and including data transmission relationships between the vertices as sides thereof, and outputting the relationship graph.

A non-transitory computer-readable recording medium according to an aspect of the present invention records a program for causing a computer to execute the processes of generating a relationship graph based on an event log indicating a behavior of each of a plurality of processes operating in a system, the relationship graph including the processes as vertices thereof and including data transmission relationships between the vertices as sides thereof, and outputting the relationship graph.

Advantageous Effects of Invention

The present invention may output information which indicates the state of the information processing system including the data transmission relationship between elements constituting an information processing system.

BRIEF DESCRIPTION OF DRAWINGS

FIG. 25 is a block diagram illustrating the configuration of an information processing device according to a second exemplary modification to the fourth exemplary embodiment.

DESCRIPTION OF EMBODIMENTS

Figure 1:
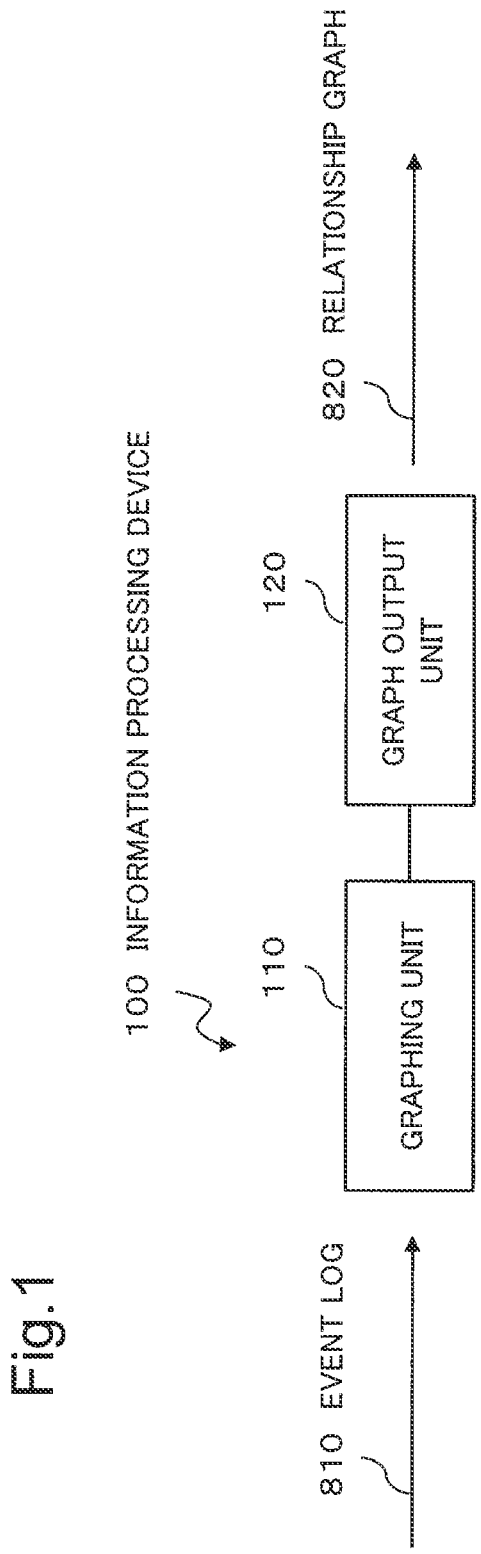
FIG. 1 is a block diagram illustrating a configuration of an information processing device according to a first exemplary embodiment of the present invention.

Exemplary embodiments of the present invention will be described in detail below with reference to the drawings. In each drawing and each exemplary embodiment described in the present description, the same reference numerals denote the same components, and a description thereof will be omitted as appropriate.

First Exemplary Embodiment

FIG. 1 is a block diagram illustrating the configuration of an information processing device 100 according to a first exemplary embodiment of the present invention.

The information processing device 100 according to the present exemplary embodiment includes a graphing unit 110 and a graph output unit 120, as illustrated in FIG. 1. Components illustrated in FIG. 1 may be divided for each hardware-specific circuit or each function of a computer device. Components illustrated in FIG. 1 are assumed herein to be divided for each function of a computer device.

Figure 2:
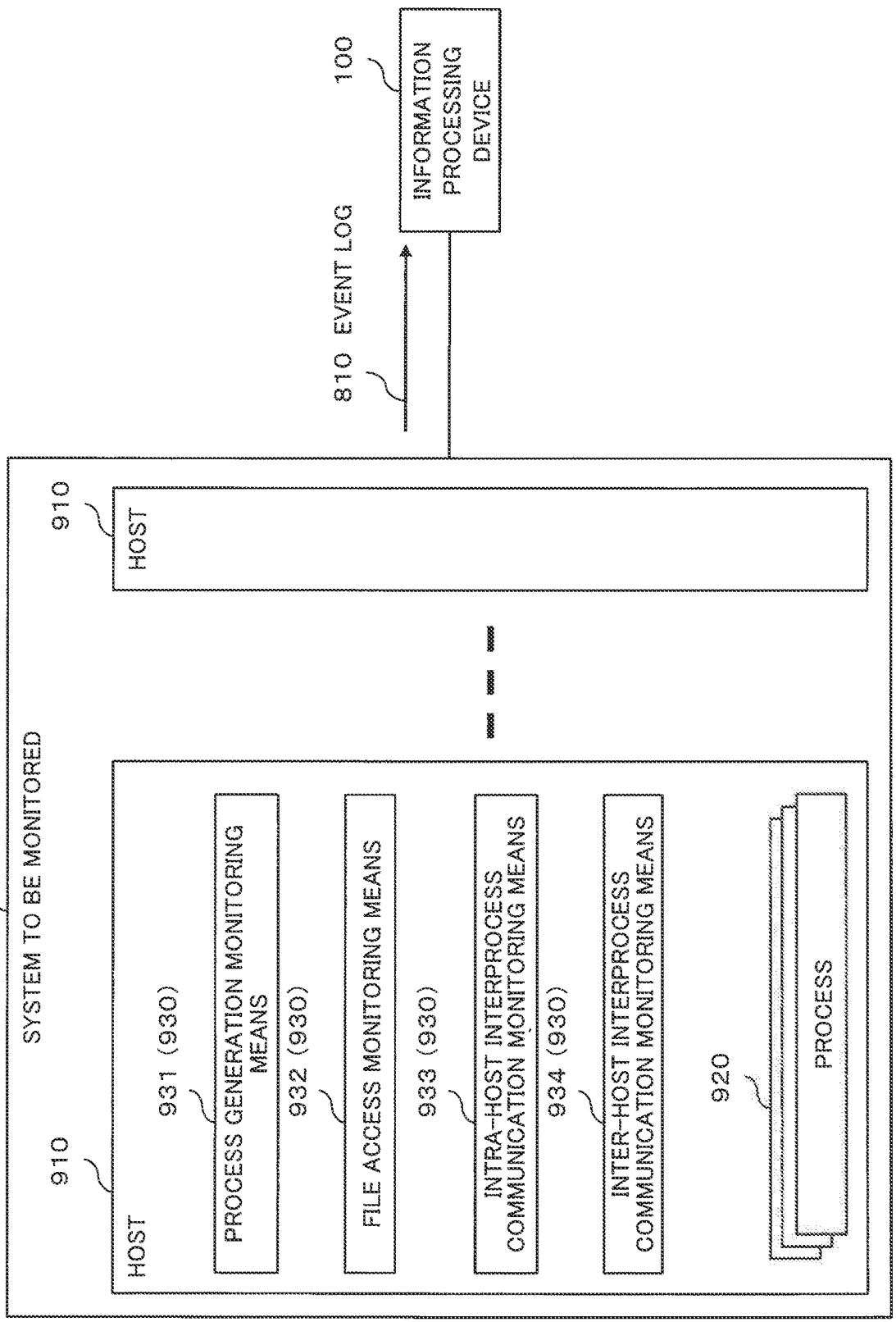
FIG. 2 is a block diagram illustrating a configuration of an information processing system including the information processing device and a system to be monitored according to the first exemplary embodiment.

FIG. 2 is a block diagram illustrating the configuration of an information processing system including the information processing device 100 and a system to be monitored (to be also simply referred to as a "system" hereinafter) 900. A plurality of systems to be monitored 900 may be connected to the information processing device 100 without limitation to the example illustrated in FIG. 2.

===System to be Monitored 900===

The system to be monitored 900 includes a plurality of hosts 910. Examples of the hosts 910 include a computer, a server, a storage device, and a communication controller. The system to be monitored 900 may include only one host 910 without limitation to the example illustrated in FIG. 2. Each host 910 and the information processing device 100 are connected to each other via a network (not illustrated).

===Host 910===

The host 910 includes a process 920, a process generation monitoring means 931, a file access monitoring means 932, an intra-host interprocess communication monitoring means 933, and an inter-host interprocess communication monitoring means 934.

Examples of each of the process generation monitoring means 931, the file access monitoring means 932, the intra-host interprocess communication monitoring means 933, and the inter-host interprocess communication monitoring means 934 include a monitoring agent which operates on the host 910.

The process generation monitoring means 931 monitors the generation of a new process 920 by the process 920 and the end of the process 920. Upon detecting each of the generation and the end, the process generation monitoring means 931 sends an event log 810 indicating details.

The file access monitoring means 932 monitors an access to a file by the process 920. Upon detecting the access, the file access monitoring means 932 sends an event log 810 indicating details.

Each of the intra-host interprocess communication monitoring means 933 and the inter-host interprocess communication monitoring means 934 monitors the communication between processes, and sends an event log 810 indicating details upon detecting the communication.

Examples of intra-host interprocess communication include a pipe, message queue, a shared memory, and a UNIX® domain socket.

Examples of inter-host interprocess communication include a TCP (Transmission Control Protocol) socket, an RPC (Remote Procedure Call), an HTTP (Hypertext Transfer Protocol) request, and an HTTP response.

The process generation monitoring means 931, the file access monitoring means 932, the intra-host interprocess communication monitoring means 933, and the inter-host interprocess communication monitoring means 934 will also be collectively referred to as event monitoring means 930 hereinafter.

The host 910 may include only an arbitrary part of the event monitoring means 930 as an event monitoring means without limitation to the example illustrated in FIG. 2. The host 910 may further include an event monitoring means for an arbitrary event, other than the event monitoring means 930, as an event monitoring means. Examples of the arbitrary event include events associated with a clipboard, a registry, and an environment variable.

===Graphing Unit 110===

The graphing unit 110 generates a relationship graph 820 based on the event log 810 of the system to be monitored 900.

===Event Log 810===

Examples of the event log 810 include information indicating the behavior of each of a plurality of processes 920 operating in the system to be monitored 900. The graphing unit 110, for example, obtains the event log 810 from the event monitoring means 930 provided for each host 910.

Figure 3:
FIG. 3 is a view illustrating an exemplary event log in the first exemplary embodiment.

FIG. 3 is a view illustrating an event log 811 as a specific example of the event log 810. The event log 811 illustrated in FIG. 3 represents an event in which "a process 920 "P3" sent a request message associated with data to a process 920 "P4" and the process 920 "P4" sent a response message associated with data to the process 920 "P3."" Note that "P3" and "P4" are identifiers for the process 920. For example, the process 920 "P3" indicates a process 920 having an identifier "P3."

The event log 811 illustrated in FIG. 3 is sent by the intra-host interprocess communication monitoring means 933 when the process 920 "P3" and the process 920 "P4" are processes 920 in the same host 910. The event log 811 illustrated in FIG. 3 is sent by the inter-host interprocess communication monitoring means 934 when the process 920 "P3" and the process 920 "P4" are processes 920 operating in different hosts 910.

===Relationship Graph 820===

The relationship graph 820 has each process 920 as its vertex (also called a node or a node point) and the data transmission relationships between the processes 920 as its sides (also called links, edges, or branches). The relationship graph 820 represents the relationship between the processes 920 in the system to be monitored 900. Examples of this relationship include herein a data transmission relationship in which "data is transmitted between processes during a certain period," and a data transmission relationship in which "data transmission may take place between processes at a certain moment (or during a certain period)."

More specifically, the data transmission relationship means data transfer from a given process 920 to a different process 920 (the "transfer" means "send" for the given process 920 and "receive" for the different process 920). The data transmission relationship may be a relationship between a plurality of processes 920 in which data are written into and read from a specific file, obtained by the file access monitoring means 932. The data transmission relationship may further be the generation and deletion of one process 920 (child process) by another process 920 (parent process). The data transmission relationship may even be, for example, an establishment of connection from one process 920 to another process 920 or a termination of connection between one process 920 and another process 920. The connection may be arbitrary connection such as connection in a transport layer such as TCP, or connection implemented in a session layer or an application layer.

===Relationship Graph 821===

Figure 4:
FIG. 4 is a view illustrating an exemplary relationship graph in the first exemplary embodiment.

FIG. 4 is a view illustrating a relationship graph 821 as a specific example of the relationship graph 820. The relationship graph 821 is defined by a record including vertex identifiers and sides, as illustrated in FIG. 4. Examples of the vertex identifiers include identifiers for processes 920 forming vertices. The side includes information indicating the data transmission relationships from a vertex (process 920) specified by each vertex identifier to other vertices.

For example, the vertex identifier "P1" specifies a process 920 having the identifier "P1." The side "P2; SEND, P3; SEND; RECEIVE" corresponding to the vertex identifier "P1" indicates the following information. First, the portion "P2; SEND" indicates that a process 920 "P1" sent data to a process 920 "P2." Second, the portion "P3; SEND" indicates that the process 920 "P1" sent data to a process 920 "P3." Third, the portion "P3; RECEIVE" indicates that the process 920 "P1" received data from the process 920 "P3."

For example, the side "P4; RECEIVE" in a record having the vertex identifier "P3" and the side "P3; SEND" in a record having the vertex identifier "P4" are based on the event log 811 illustrated in FIG. 3.

===Relationship Graph 822===

Figure 5:
FIG. 5 is a view illustrating another exemplary relationship graph in the first exemplary embodiment.

FIG. 5 is a view illustrating a relationship graph 822 as another specific example of the relationship graph 820.

The relationship graph 822 is defined by a record including sides each representing a pair of vertex identifiers, and side attributes (types), as illustrated in FIG. 5. The side represents a pair of identifiers for processes 920 forming vertices. The side attribute includes information indicating the data transmission relationship between vertices (processes 920) specified by the side.

===Relationship Graph 824===

Figure 6:
FIG. 6 is a view illustrating still another exemplary relationship graph in the first exemplary embodiment.

FIG. 6 is a view illustrating a relationship graph 824 as still another specific example of the relationship graph 820.

FIG. 6 illustrates exemplary relationship graphs 820 corresponding to the following first to fifth event logs 810. In the following description, a process P1 is a process 920 in a first host 910. A process P2 is a process 920 in a second host 910. A file F1 is a file (one type of process 920) in the first host 910. A file F2 is a file (one type of process 920) in the second host 910.

The first event log 810 indicates "the process P1 reads the file F1" sent by the file access monitoring means 932 in the first host 910. The vertex identifier "P1" and the side "F1; READ" in the relationship graph 824 correspond to the first event log 810.

The second event log 810 indicates "the process P1 performs bidirectional communication with the process P2" sent by a first inter-host interprocess communication monitoring means 934 in the first host 910. The vertex identifier "P1" and the side "P2; SEND/RECEIVE," and the vertex identifier "P2" and the side "P1; SEND/RECEIVE" in the relationship graph 824 correspond to the second event log 810.

The third event log 810 indicates "the process P2 reads/writes data from/into the file F2" sent by the file access monitoring means 932 in the second host 910. The vertex identifier "P2" and the side "F2; READ/WRITE" in the relationship graph 824 correspond to the third event log 810.

The fourth event log 810 indicates "the process P2 generates a process P3 which uses the file F2 as an execution file" sent by the process generation monitoring means 931 in the second host 910. The vertex identifier "P2" and the side "P3; GENERATE" in the relationship graph 824 correspond to the fourth event log 810.

The fifth event log 810 indicates "the process P3 reads the file F2" sent by the file access monitoring means 932 in the second host 910. The vertex identifier "P3" and the side "F2; READ" in the relationship graph 824 correspond to the fifth event log 810.

The relationship graph 820 may take any form without limitation to the above-mentioned examples. The relationship graph 820 may have, for example, an adjacency matrix data structure.

===Relationship Between Processes 920 Represented by Relationship Graph 820===

Figure 7:
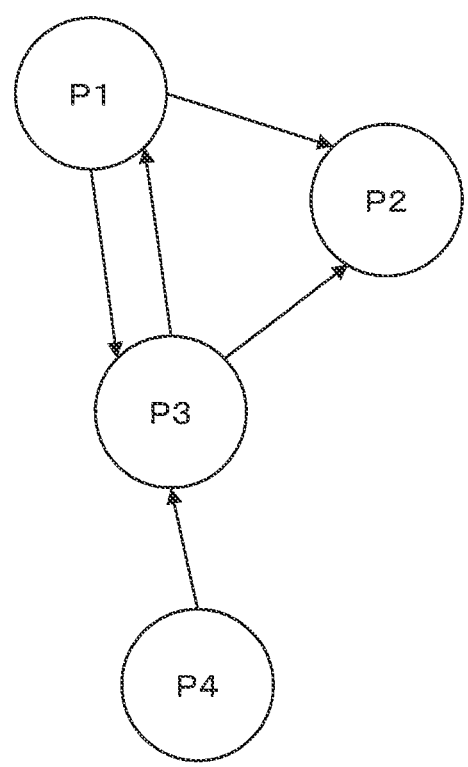
FIG. 7 is a conceptual view illustrating a relationship between processes represented by the relationship graph in the first exemplary embodiment.

FIG. 7 is a conceptual view illustrating the relationship between the processes 920 represented by the relationship graph 820, such as the relationship graph 821, 822, or 823.

Referring to FIG. 7, vertices are represented in circles and vertex identifiers are marked within the circles. Sides are represented by line segments which connect the circles to each other. For example, each line segment indicates "SEND" or "RECEIVE." The graph illustrated in FIG. 7 is a directed graph and the direction pointed by an arrow of each line segment is the direction in which data flows. A line segment having arrows at its two ends indicates that the side includes both "SEND" and "RECEIVE."

The sides may be directed (with an arrow) or undirected (without an arrow) without limitation to the example illustrated in FIG. 7. For example, the side between the process 920 "P1" and the process 920 "P2" only indicating the presence of connection may be undirected. When, for example, the request and standby sides of connection need to be specified, the side may be effective.

===Graph Output Unit 120===

The graph output unit 120 outputs a relationship graph 820 generated by the graphing unit 110.

Function-specific components of the information processing device 100 have been described above.

Hardware-specific components of the information processing device 100 will be described below.

Figure 8:
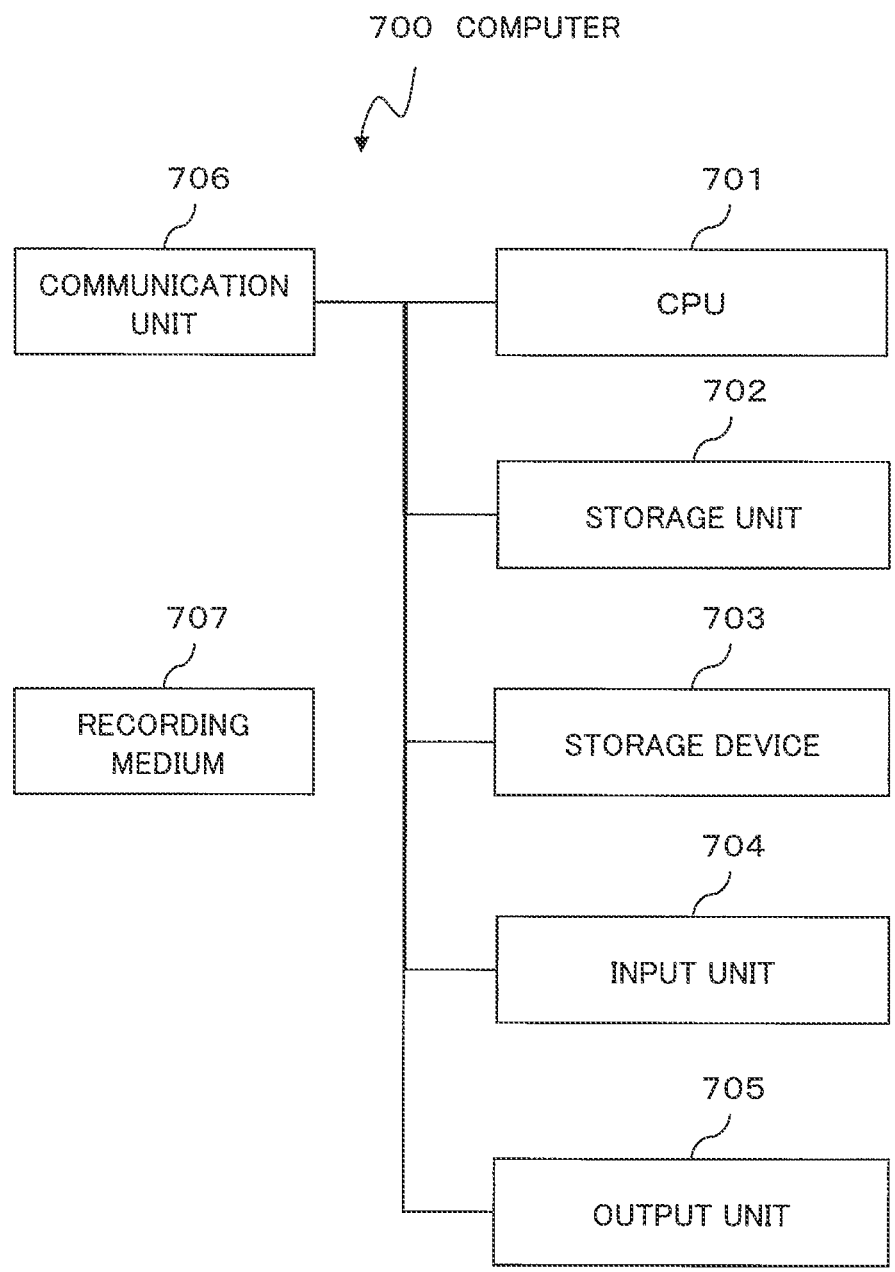
FIG. 8 is a block diagram illustrating a hardware configuration of a computer which implements the information processing device according to the first exemplary embodiment.

FIG. 8 is a block diagram illustrating the hardware configuration of a computer 700 which implements the information processing device 100 according to the present exemplary embodiment.

The computer 700 includes a CPU (Central Processing Unit) 701, a storage unit 702, a storage device 703, an input unit 704, an output unit 705, and a communication unit 706, as illustrated in FIG. 8. The computer 700 further includes an externally supplied recording medium (or storage medium) 707. For example, the recording medium 707 is a non-volatile recording medium (non-transitory recording medium) which non-transitorily stores information. The recording medium 707 may be a transitory recording medium which holds information as a signal.

The CPU 701 runs the operating system (not illustrated) to control the operation of the overall computer 700. For example, the CPU 701 reads a program or data from the recording medium 707 mounted in the storage device 703 and writes the read program or data into the storage unit 702. Examples of the program include a program for causing the computer 700 to execute the operation in a flowchart illustrated in FIG. 9 (to be described later).

The CPU 701 executes various types of processing as the graphing unit 110 and the graph output unit 120 illustrated in FIG. 1, in accordance with the read program and the read data.

The CPU 701 may download the program or the data from an external computer (not illustrated) connected to a communication network (not illustrated) to the storage unit 702.

The storage unit 702 stores the program or the data. The storage unit 702 may store the event log 810 and the relationship graph 820.

Examples of the storage device 703 include an arbitrary optical disk, flexible disk, magneto-optical disk, external hard disk, and semiconductor memory. The storage device 703 stores the program in a computer-readable manner. The storage device 703 may further store the data. The storage device 703 may even store the event log 810 and the relationship graph 820.

The input unit 704 receives operator's operation input and external information input. Examples of a device used for input operations include an arbitrary mouse, keyboard, internal key button, and touch panel.

The output unit 705 is implemented in, for example, a display. The output unit 705 is used for an input request to the operator via a GUI (Graphical User Interface), and output presentation to the operator, for example.

The communication unit 706 implements an interface with the host 910 and an arbitrary device 940 (to be described later). The communication unit 706 may be included as parts of the graphing unit 110 and the graph output unit 120.

Function-specific blocks of the information processing device 100 illustrated in FIG. 1 are implemented by the computer 700 having the hardware configuration illustrated in FIG. 8, as described above. Note, however, that the means for implementing each unit of the computer 700 is not limited to the foregoing description. In other words, the computer 700 may be implemented in a single physically-coupled device or two or more physically-isolated devices connected in a wired or wireless fashion.

When the recording medium 707 recording the code of the above-mentioned program is supplied to the computer 700, the CPU 701 may read and execute the program code stored in the recording medium 707. Alternatively, the CPU 701 may store in the storage unit 702 and/or the storage device 703, the program code stored in the recording medium 707. In other words, the present exemplary embodiment includes an exemplary embodiment of a recording medium 707 which transitorily or non-transitorily stores the program (software) executed by the computer 700 (CPU 701). A storage medium which non-transitorily stores information is also called a non-volatile storage medium.

Each hardware-specific component of the computer 700 implementing the information processing device 100 in the present exemplary embodiment has been described above.

An operation in the present exemplary embodiment will be described in detail below with reference to the drawings.

Figure 9:
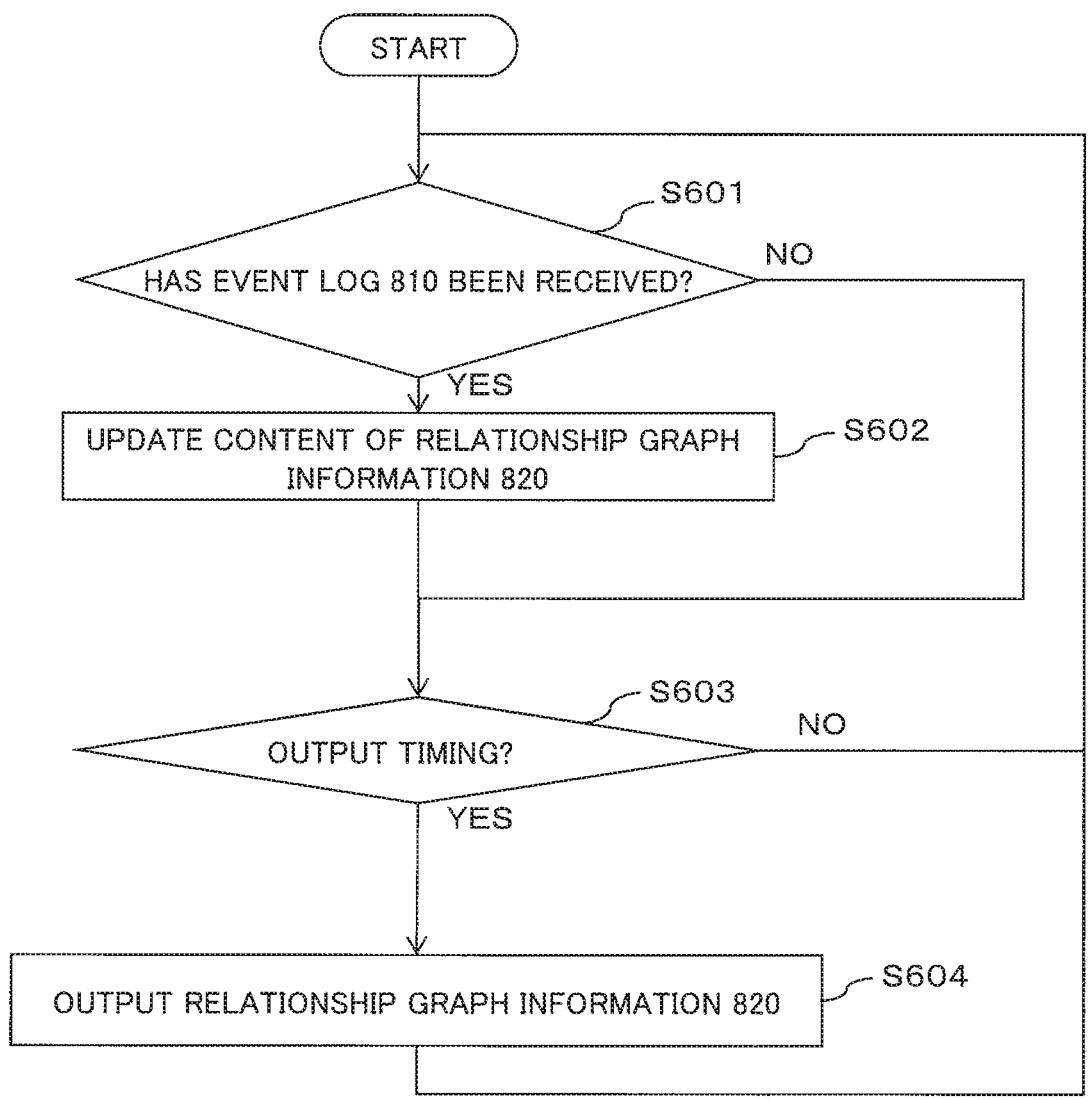
FIG. 9 is a flowchart illustrating the operation of the information processing device in the first exemplary embodiment.

FIG. 9 is a flowchart illustrating an operation in the present exemplary embodiment. Processing in the flowchart may be executed on the basis of program control by the CPU 701 mentioned earlier. Processing steps are denoted by symbols, such as S601.

The graphing unit 110 automatically starts up its operation upon the completion of initialization of the information processing device 100. Upon the completion of initialization, the content of the relationship graph 820 is empty. The relationship graph 820 is held in, for example, the storage unit 702 or the storage device 703 illustrated in FIG. 8.

The graphing unit 110 determines whether an event log 810 is received (step S601). The graphing unit 110, for example, receives an event log 810 from the system to be monitored 900 via the communication unit 706 illustrated in FIG. 8.

If an event log 810 is received (YES in step S601), the graphing unit 110 generates or updates the content of the relationship graph 820 based on the received event log 810 (step S602). The process then advances to step S603.

If no event log 810 is received (NO in step S601), the process advances to step S603.

The graph output unit 120 determines whether it is output timing of the relationship graph 820 (step S603). When, for example, an instruction is received from the operator via the input unit 704 illustrated in FIG. 8, the graph output unit 120 determines that it is the output timing.

When a predetermined time of day is detected using a time measuring means (not illustrated), the graph output unit 120 may determine that it is the output timing. The graph output unit 120 may determine whether it is the output timing by using an arbitrary method without limitation to the above-mentioned examples.

If the timing is appropriate to output (YES in step S603), the graph output unit 120 outputs the relationship graph 820 (step S604). The process then returns to step S601.

For example, the graph output unit 120 outputs the relationship graph 820 via the output unit 705 illustrated in FIG. 8. The graph output unit 120 may send the relationship graph 820 to a device (not illustrated) via the communication unit 706 illustrated in FIG. 8. The graph output unit 120 may record the relationship graph 820 on the recording medium 707 via the storage device 703 illustrated in FIG. 8.

If the timing is not appropriate to output (NO in step S603), the process returns to step S601.

In the flowchart illustrated in FIG. 9, the graphing unit 110 and the graph output unit 120 operate sequentially in series. The graphing unit 110 and the graph output unit 120 may operate in parallel.

In the flowchart illustrated in FIG. 9, the graphing unit 110 updates the relationship graph 820 every time an event log 810 is received. However, the graphing unit 110 may accumulate the received event log 810 and generate or update a relationship graph 820 based on the accumulated event log 810 at a specific timing (for example, immediately before the graph output unit 120 outputs the relationship graph 820).

The graphing unit 110 may obtain an event log 810 by using an arbitrary method without limitation to the foregoing description. For example, the graphing unit 110 may collectively obtain an event log 810 from each event monitoring means 930 at a predetermined time of day. In this case, the event monitoring means 930 accumulates the event log 810 until the predetermined time.

An event log 810 may be stored in the storage unit 702 or the storage device 703 illustrated in FIG. 8 in advance. The graphing unit 110 may obtain an event log 810 input by the operator via the input unit 704 illustrated in FIG. 8. The graphing unit 110 may receive an event log 810 from a device (not illustrated) via the communication unit 706 illustrated in FIG. 8. The graphing unit 110 may obtain an event log 810 recorded on the recording medium 707 via the storage device 703 illustrated in FIG. 8.

<<<First Exemplary Modification to First Exemplary Embodiment>>>

The graphing unit 110 generates a relationship graph 820 having a predetermined device as its vertex based on an event log 810 indicating the behavior of each such arbitrary device. Examples of the arbitrary device include an arbitrary host in which no monitoring agent can be located, a router, a sensor, a printer, and a network device.

In this case, the graphing unit 110 further sets the data transmission relationships between the predetermined devices and between the predetermined devices and the processes 920 as sides.

Figure 10:
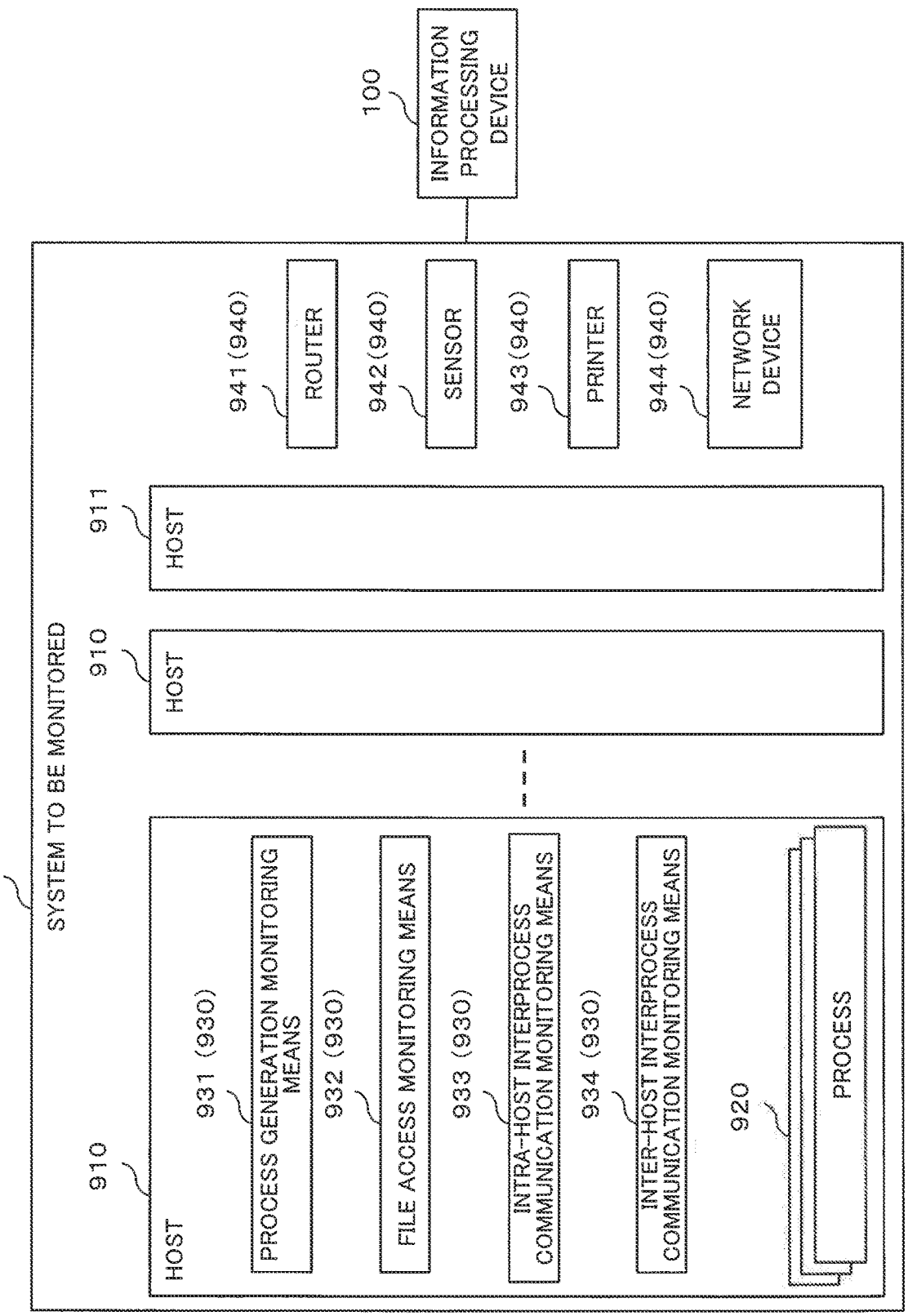
FIG. 10 is a block diagram illustrating the configuration of an information processing system including a system to be monitored and an information processing device according to a first exemplary modification to the first exemplary embodiment.

FIG. 10 is a block diagram illustrating the configuration of an information processing system including the information processing device 100 and a system to be monitored 901 including hosts 910 and 911, a router 941, a sensor 942, a printer 943, and a network device 944. The router 941, the sensor 942, the printer 943, and the network device 944 will also be collectively referred to as arbitrary devices 940 hereinafter.

The graphing unit 110 further obtains an event log 810 indicating a behavior of each arbitrary device 940 from an event monitoring means for monitoring the behavior of the arbitrary device 940. The event monitoring means may be a monitoring agent implemented in the arbitrary device 940 or a device which externally monitors the behavior of the arbitrary device 940.

The host 911 itself may not be equipped with a monitoring agent. An appropriate external device for directly monitoring the behavior of the host 911 is unavailable. However, the graphing unit 110 may indirectly recognize that a data transmission relationship has occurred between the process 920 and the host 911 based on a log which may be obtained from the event monitoring means 930 on the host 910. More specifically, the host 911 may serve as, for example, a mission critical server or an external web server.

<<<Second Exemplary Modification to First Exemplary Embodiment>>>

The graphing unit 110 generates a relationship graph 820 having arbitrary files accessed by the processes 920 as its vertices, and accesses to the vertices as its sides.

More specifically, the relationships between the processes 920 and the files, represented by sides, are arbitrary relationships such as the open, close, read, and write of the files by the processes 920 and the generation and deletion of the files.

In other words, the above-mentioned arbitrary files are those for which the graphing unit 110 may not obtain event logs 810 directly indicating the behaviors of the files.

<<<Third Exemplary Modification to First Exemplary Embodiment>>>

The graphing unit 110 may generate a relationship graph 820 aggregating event logs 810 indicating the same or similar behaviors.

For example, the graphing unit 110 may generate a relationship graph 820 having only one side between a pair of a first specific process 920 and a second specific process 920. In this case, the graphing unit 110 may add, to the side, statistical information indicating the number of connection establishments, the data volume, and the frequency of access or the like.

The graphing unit 110 may calculate a criterion for determining whether a new event is normal or abnormal when the new event occurs, based on these pieces of statistical information, and add the calculated criterion to the side. For example, the graphing unit 110 may calculate a threshold for the deviation of the frequency of access from the average as a criterion for determining whether, the access is abnormal when the next access occurs, based on the average and standard deviation of the frequency of access, and add the threshold to the side.

The graphing unit 110 may set a plurality of data transmissions for the same direction between a first specific process 920 and a second specific process 920 as a single side.

===Relationship Graph 823===

Figure 11:
FIG. 11 is a view illustrating an exemplary relationship graph in a third exemplary modification to the first exemplary embodiment.

FIG. 11 is a view illustrating a relationship graph 823 as a specific example of the relationship graph 820 that aggregates event logs 810. The relationship graph 823 includes information indicating "the number of aggregated event logs" added to the sides, as illustrated in FIG. 11.

For example, the side "P2; SEND[1], P3; SEND[3]; RECEIVE[2]" in a record having the vertex identifier "P1" indicates the following information. First, the portion "P2; SEND[1]" indicates that the process 920 "P1" has transmitted data to the process 920 "P2" once. Second, the portion "P3; SEND[3]" indicates that the process 920 "P1" has transmitted data to the process 920 "P3" three times. Third, the portion "P3; RECEIVE[2]" indicates that the process 920 "P1" has received data from the process 920 "P3" twice.

The graphing unit 110 may generate a relationship graph 820 having each type of data transmission relationship individually as its side.

The types may be arbitrary types such as file access, intra-host interprocess communication, interprocess communication between different hosts, and process generation.

The graphing unit 110 may generate a relationship graph 820 having an arbitrary combination of data transmission relationships as its side. The arbitrary combination of data transmission relationships may be, for example, the above-mentioned unit of connection.

The graphing unit 110 may generate a relationship graph 820 based on an event log 810 selected based on an arbitrary criterion.

More specifically, the graphing unit 110 may generate a relationship graph 820 having only the establishment and termination of connection between the processes 920 as its sides. The graphing unit 110 may generate a relationship graph 820 having only the establishment and end of connection between the processes 920 and the open and close of files as its sides.

The graphing unit 110 may add an attribute (property) associated with the data transmission relationship to the side. Examples of the attribute include information concerning the type of data transmission relationship and time information.

For example, the graphing unit 110 may set information concerning the volume of transferred data in the data transmission relationship as an attribute for the side. The information concerning the volume of transferred data may be arbitrary information concerning the volume of transferred data, such as the transfer direction, the average or maximum value of the transfer volume per unit time, or the sum of transfer volumes during a predetermined period.

The graphing unit 110 may set information concerning the number of accesses in the data transmission relationship as an attribute for the side. The information concerning the number of accesses may be arbitrary information concerning the number of accesses, such as the access direction, the average number of accesses (average frequency) or the maximum number of accesses (maximum frequency) per unit time, or the total number of accesses during a predetermined period.

The graphing unit 110 may generate a relationship graph 820 including a side aggregating event logs 810, based on the definition of the same or similar arbitrary behaviors by using an arbitrary method. Both "the same behaviors" and "similar behaviors" will also be collectively referred to as "similar behaviors" hereinafter. The graphing unit 110 may even generate a relationship graph 820 without aggregating event logs 810.

The "definition of the same behavior or similar behavior" may be the definition of the establishment and termination of connection between the processes 920 or the open and close of files, for example. The "definition of the same behavior or similar behavior" may also be the definition of a communication protocol. The "definition of the same behavior or similar behavior" may further be the definition of arbitrary information concerning the volume of transferred data, such as the data transfer direction, the average or maximum value of the transfer volume per unit time upon division of the data volume, or the sum of transfer volumes during a predetermined period. The "definition of the same behavior or similar behavior" may even be the definition of arbitrary information concerning the number of accesses, such as the average number of accesses (average frequency) or the maximum number of accesses (maximum frequency) per unit time upon division of the number in the data transmission relationship, or the total number of accesses during a predetermined period. The "definition of the same behavior or similar behavior" may even be the definition of a time zone, which is divided into different ranges.

Aggregating event logs for each set of the same or similar behaviors may clarify the graph characteristics while reducing the information volume to be managed.

Individually aggregating event logs indicating different behaviors may facilitate the operation of event logs indicating the same or similar specific behaviors while aggregating event logs indicating the same or similar behaviors. Assume, for example, that communication based on protocol B has occurred due to an abnormality on a side where communication based on protocol A is normally performed. In such a case, after the abnormality is dealt with, an event log indicating communication based on protocol B may be easily deleted.

When a side aggregating event logs 810 is included in the relationship graph 820, the graphing unit 110 may generate an attribute for the side aggregating the event logs 810 based on the aggregated event logs 810.

The graphing unit 110 may delete a side where no event has occurred for a predetermined time from the relationship graph. Assume, for example, that one computer is discarded and the information of the computer becomes no longer necessary for the relationship graph. Then, when the graphing unit 110 detects that communication with the computer has not been performed for a predetermined time, the graphing unit 110 may delete a side having the computer as its node.

As a first effect in the above-mentioned present exemplary embodiment, information including the data transmission relationship between elements constituting a system to be monitored (system to be monitored 900 or system to be monitored 901) and indicating the state of the system to be monitored may be output.

This is because the graphing unit 110 generates a relationship graph 820 representing the structure of the system to be monitored based on the event log 810, and the graph output unit 120 outputs the relationship graph 820.

As a second effect in the above-mentioned present exemplary embodiment, the data transmission relationship between external elements and elements constituting a system to be monitored may be exhaustively covered.

This is because the graphing unit 110 further generates a relationship graph 820 having arbitrary files and arbitrary devices as its vertices.

As a third effect in the above-mentioned present exemplary embodiment, the first effect may be obtained regardless of the scale or complexity of a system to be monitored.

This is because the graphing unit 110 generates a relationship graph 820 aggregating event logs 810.

As a fourth effect in the above-mentioned present exemplary embodiment, information including the data transmission relationship between elements constituting a system to be monitored, and more appropriately indicating the state of the system to be monitored may be output.

This is because the graphing unit 110 generates a relationship graph 820 based on a arbitrary selected event log 810.

Second Exemplary Embodiment

A second exemplary embodiment of the present invention will be described in detail below with reference to the drawings. A description of details which are the same as in the foregoing description will be omitted hereinafter within the range in which an explanation of the present exemplary embodiment does not become unclear.

Figure 12:
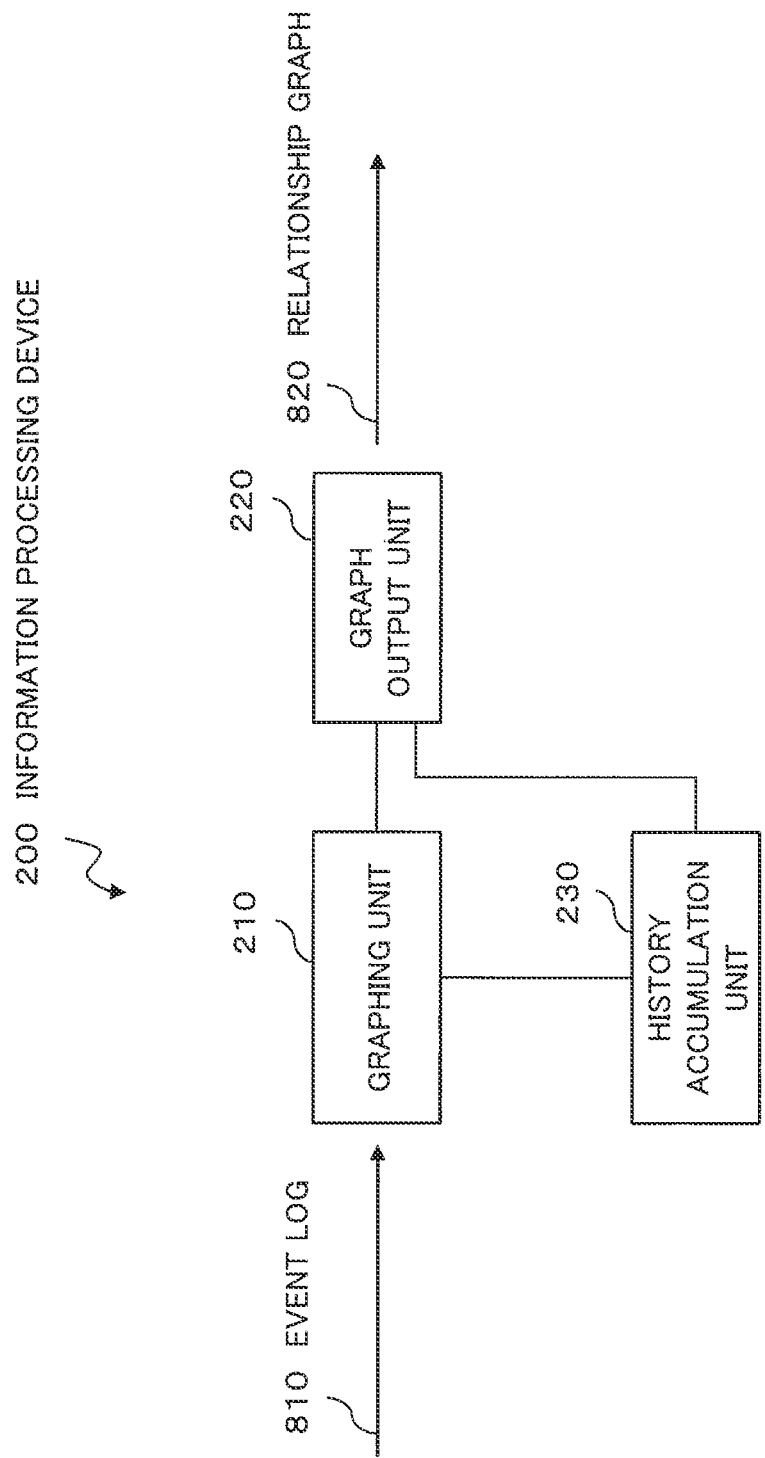
FIG. 12 is a block diagram illustrating a configuration of an information processing device according to a second exemplary embodiment of the present invention.

FIG. 12 is a block diagram illustrating the configuration of an information processing device 200 according to the second exemplary embodiment of the present invention.

The information processing device 200 in the present exemplary embodiment is different from the information processing device 100 in the first exemplary embodiment in that the former includes a graphing unit 210 in place of the graphing unit 110 and a graph output unit 220 in place of the graph output unit 120, as illustrated in FIG. 12. The information processing device 200 is further different from the information processing device 100 in that the former includes a history accumulation unit 230.

===Graphing Unit 210===

The graphing unit 210 records, at a predetermined timing, information capable of restoring a relationship graph 820 available at the point in time in the history accumulation unit 230 in association with, for example, the time of day at the point in time. Examples of the predetermined timing include a predetermined time of day. The predetermined timing may be the timing at which the number of processes of an event log 810 reaches a predetermined threshold. The predetermined timing may be an arbitrary timing without limitation to the above-mentioned examples. Examples of the information capable of restoring a relationship graph 820 available at the point in time include the difference from a relationship graph 820 available at any previous point in time (for example, one point in time before the predetermined point in time). The information capable of restoring a relationship graph 820 available at the point in time may even be the relationship graph 820 itself available at the point in time.

The graphing unit 210 may record the latest relationship graph 820 in the history accumulation unit 230 as a temporary relationship graph, and update the temporary relationship graph and its associated time of day every time an event log 810 is obtained. In this case, the graphing unit 210 may stop updating the temporary relationship graph at the predetermined timing and determine the temporary relationship graph as a final relationship graph 820.

The graphing unit 210 is equivalent to the graphing unit 110 illustrated in FIG. 1 except for the aforementioned respect.

===History Accumulation Unit 230===

The history accumulation unit 230 stores the relationship graph 820. The history accumulation unit 230 may further store the above-mentioned temporary relationship graph.

===Graph Output Unit 220===

The graph output unit 220 outputs, in step S604 of FIG. 9, for example, any of the relationship graph 820 stored in the history accumulation unit 230 and the latest relationship graph 820 that is generated by the graphing unit 210 and has not yet been stored in the history accumulation unit 230. The graph output unit 220 may output the temporary relationship graph stored in the history accumulation unit 230.

As an effect in the above-mentioned present exemplary embodiment, the past and current relationship graphs 820 may be output, in addition to the effect of the first exemplary embodiment.

This is because the graphing unit 210 records a relationship graph 820 in the history accumulation unit 230 at a predetermined timing, and the graph output unit 220 outputs the relationship graph 820 stored in the history accumulation unit 230.

<<<Exemplary Modification to Second Exemplary Embodiment>>>

Figure 20:
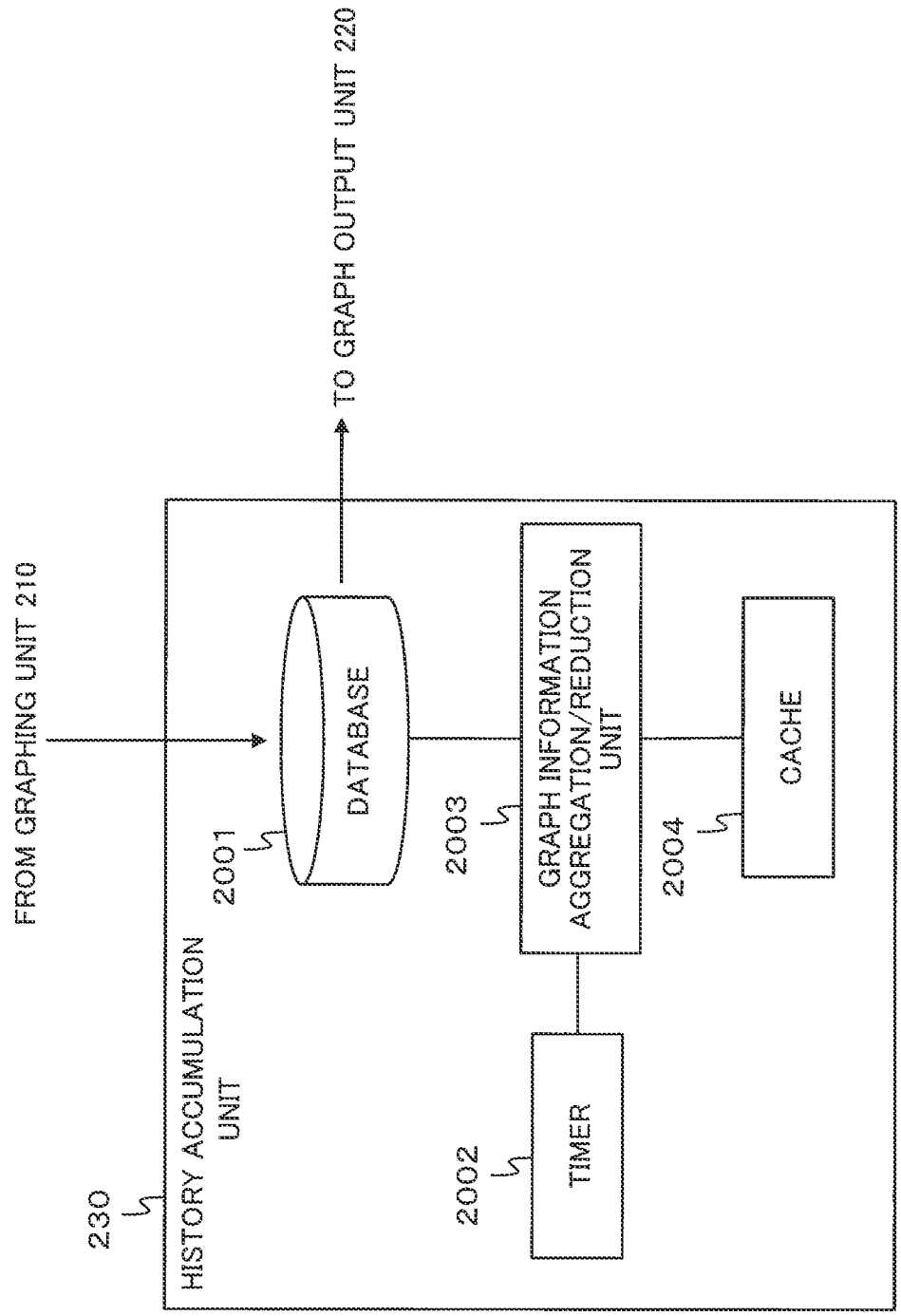
FIG. 20 is a block diagram illustrating an exemplary internal configuration of a history accumulation unit in an exemplary modification to the second exemplary embodiment.

FIG. 20 is a block diagram illustrating an exemplary internal configuration of the history accumulation unit 230 in the present exemplary modification.

The history accumulation unit 230 according to the present exemplary modification includes a database 2001, a timer 2002, a graph information aggregation/reduction unit 2003, and a cache 2004, as illustrated in FIG. 20.

Figure 21:
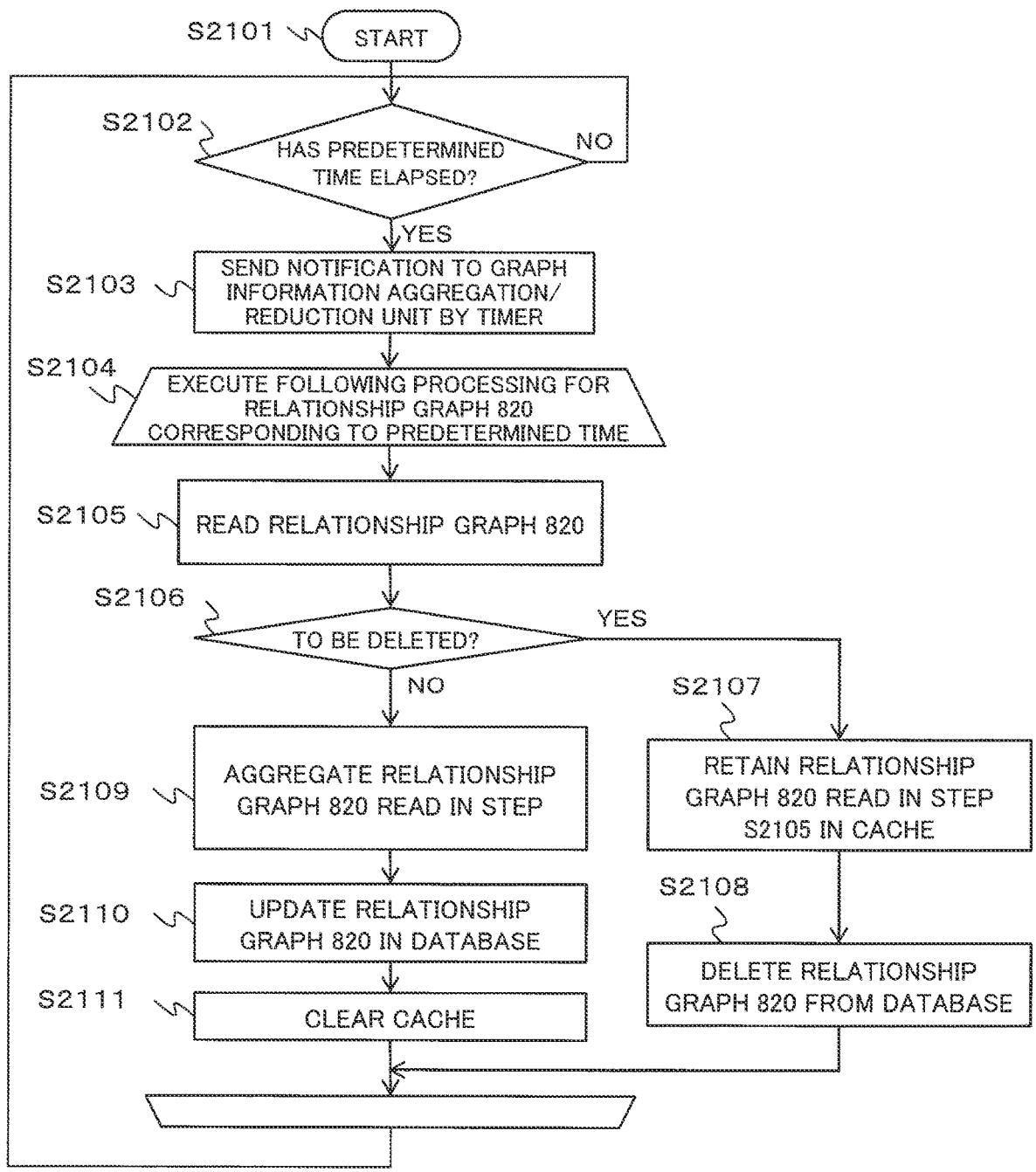
FIG. 21 is a flowchart illustrating an operation of the history accumulation unit in the exemplary modification to the second exemplary embodiment.

FIG. 21 is a flowchart illustrating the operation of the history accumulation unit 230 in the present exemplary modification.

The graphing unit 210 writes a relationship graph 820 into the database 2001 asynchronously to the operation in the flowchart illustrated in FIG. 21. Similarly, the graph output unit 220 reads the relationship graph 820 from the database 2001.

The timer 2002 measures time and detects the elapse of a predetermined time (S2102).

Then, the timer 2002 activates the graph information aggregation/reduction unit 2003 (2103). When the timer 2002 simultaneously detects the elapse of a plurality of predetermined times, the graph information aggregation/reduction unit 2003 is activated in turn in correspondence with each of the plurality of predetermined times.

Then, the graph information aggregation/reduction unit 2003 sequentially executes the following processes in steps S2105 to S2111 for all relationship graphs 820 corresponding to the predetermined times and recorded in the database 2001 (S2104). The relationship graph 820 recorded in the database 2001 will also be referred to as a history relationship graph hereinafter.

The graph information aggregation/reduction unit 2003 reads one of the relationship graphs 820 corresponding to the predetermined times from the database 2001 (S2105).

The graph information aggregation/reduction unit 2003 determines whether the relationship graph 820 is to be deleted (S2106). Examples of the determination method may include a method for generating random numbers to stochastically determine whether the relationship graph 820 is to be deleted based on the random numbers.

If it is determined that "the relationship graph 820 is to be deleted" (YES in step S2106), the graph information aggregation/reduction unit 2003 retains the relationship graph 820 in the cache (S2107).

Then, the graph information aggregation/reduction unit 2003 deletes the relationship graph 820 from the database (S2108).

If it is determined that "the relationship graph 820 is not to be deleted" (NO in step S2106), the graph information aggregation/reduction unit 2003 aggregates the relationship graph 820 read in step S2105 and the cached relationship graph 820 together (S2109). Examples of the method for aggregating the relationship graphs 820 may include holding pieces of identical information (for example, the same "node-edge-node" relationship) not separately but as one such piece of information and adding the number of such pieces of information.

Then, the graph information aggregation/reduction unit 2003 updates the relationship graph 820 in the database 2001 (S2110).

The graph information aggregation/reduction unit 2003 clears the cache 2004 (S2111). In other words, the graph information aggregation/reduction unit 2003 deletes the relationship graph 820 in the cache 2004 (that is, the aggregated relationship graphs 820).

Figure 22:
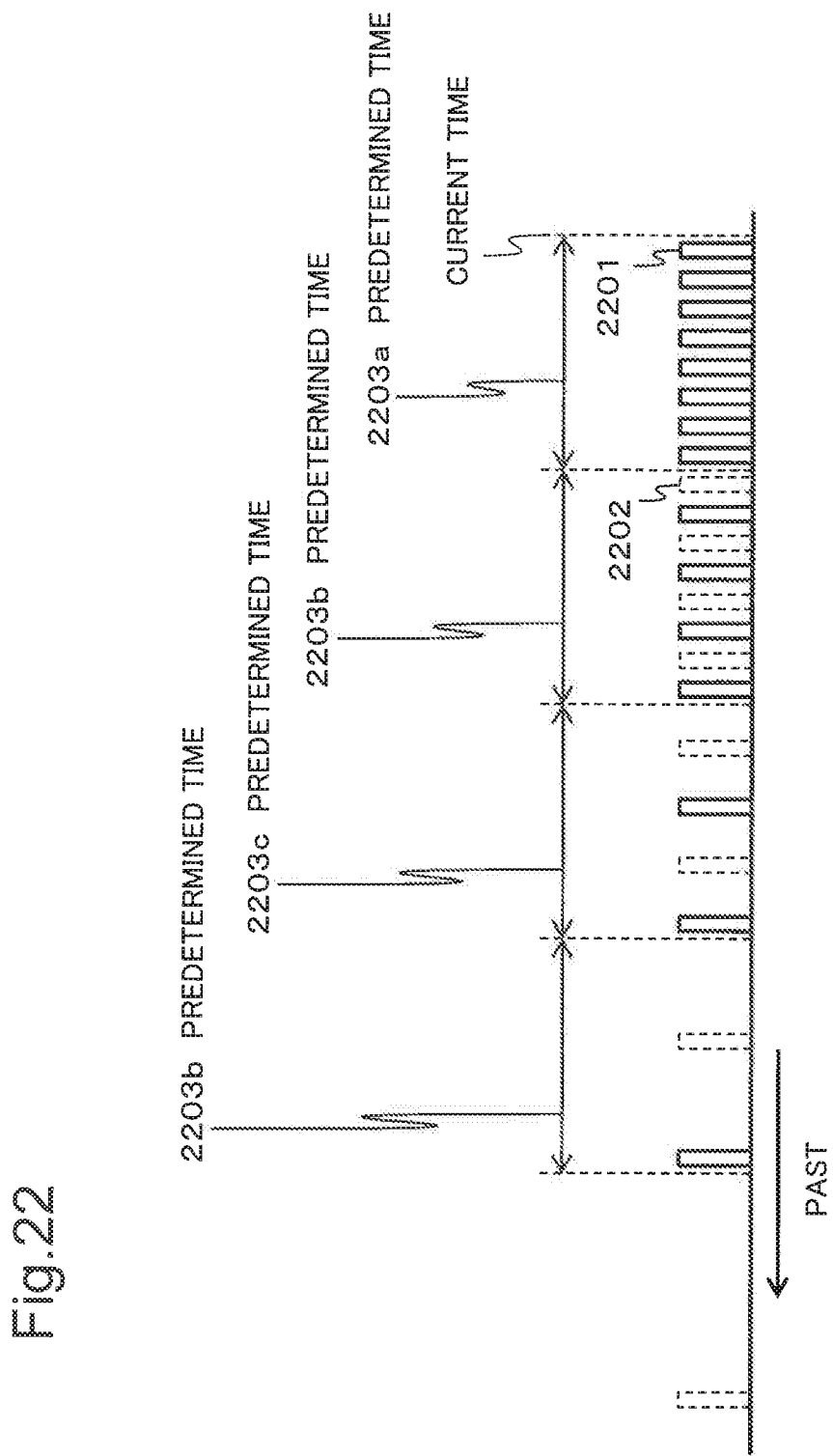
FIG. 22 is a chart for explaining how the relationship graph reduces with time according to the exemplary modification to the second exemplary embodiment.

FIG. 22 is a chart for explaining how the relationship graph 820 in the database 2001 reduces with time according to the present exemplary modification.

Referring to FIG. 22, solid rectangles (for example, 2201) represent held relationship graphs 820 plotted at the positions of the times of occurrence, and dotted rectangles (for example, 2202) represent deleted, aggregated relationship graphs 820.

All late relationship graphs 820 (in a predetermined time 2203*a* preceding the current time) are held. In contrast to this, relationship graphs 820 after the elapse of the predetermined time 2203*a* (in a predetermined time 2203*b* preceding the start of the predetermined time 2203*a*) are stochastically deleted. The information of the relationship graph 820 to be deleted is aggregated with the identical information of the subsequent relationship graph 820. Relationship graphs 820 after the further elapse of the predetermined time 2203*b* (in a predetermined time 2203*c* preceding the start of the predetermined time 2203*b*) are further stochastically deleted and aggregated.

The predetermined times (for example, the predetermined time 2203*b* preceding the start of the predetermined time 2203*a*, and the predetermined time 2203*c* preceding the start of the predetermined time 2203*b*) may be the same as or different from each other. For example, as going back to the past, the predetermined time may be prolonged.

The probabilities that the relationship graphs 820 will be deleted corresponding to the respective predetermined times may be the same as or different from each other.

As a first effect in the above-mentioned present exemplary embodiment, the data volume of the history accumulation unit 230 (database 2001) that infinitely increases when the history of the relationship graph 820 is accumulated without specific regulation may be kept less.

This is because the graph information aggregation/reduction unit 2003 deletes the relationship graph 820 recorded in the database 2001, based on the elapse of time.

As a second effect in the above-mentioned present exemplary embodiment, increase in the data volume of the history accumulation unit 230 may be more appropriately suppressed.

This is because the graph information aggregation/reduction unit 2003 stochastically deletes the relationship graph 820 recorded in the database 2001.

As a third effect in the above-mentioned present exemplary embodiment, for the relationship graph 820 recorded in the history accumulation unit 230, increase in the data volume of the history accumulation unit 230 may be suppressed while reducing decay of the information recorded in the history accumulation unit 230.

This is because the graph information aggregation/reduction unit 2003 aggregates information included in a relationship graph 820 to be deleted with a relationship graph 820 that is not to be deleted.

Third Exemplary Embodiment

A third exemplary embodiment of the present invention will be described in detail below with reference to the drawings. A description of details which are the same as in the foregoing description will be omitted hereinafter within the range in which an explanation of the present exemplary embodiment does not become unclear.

Figure 13:
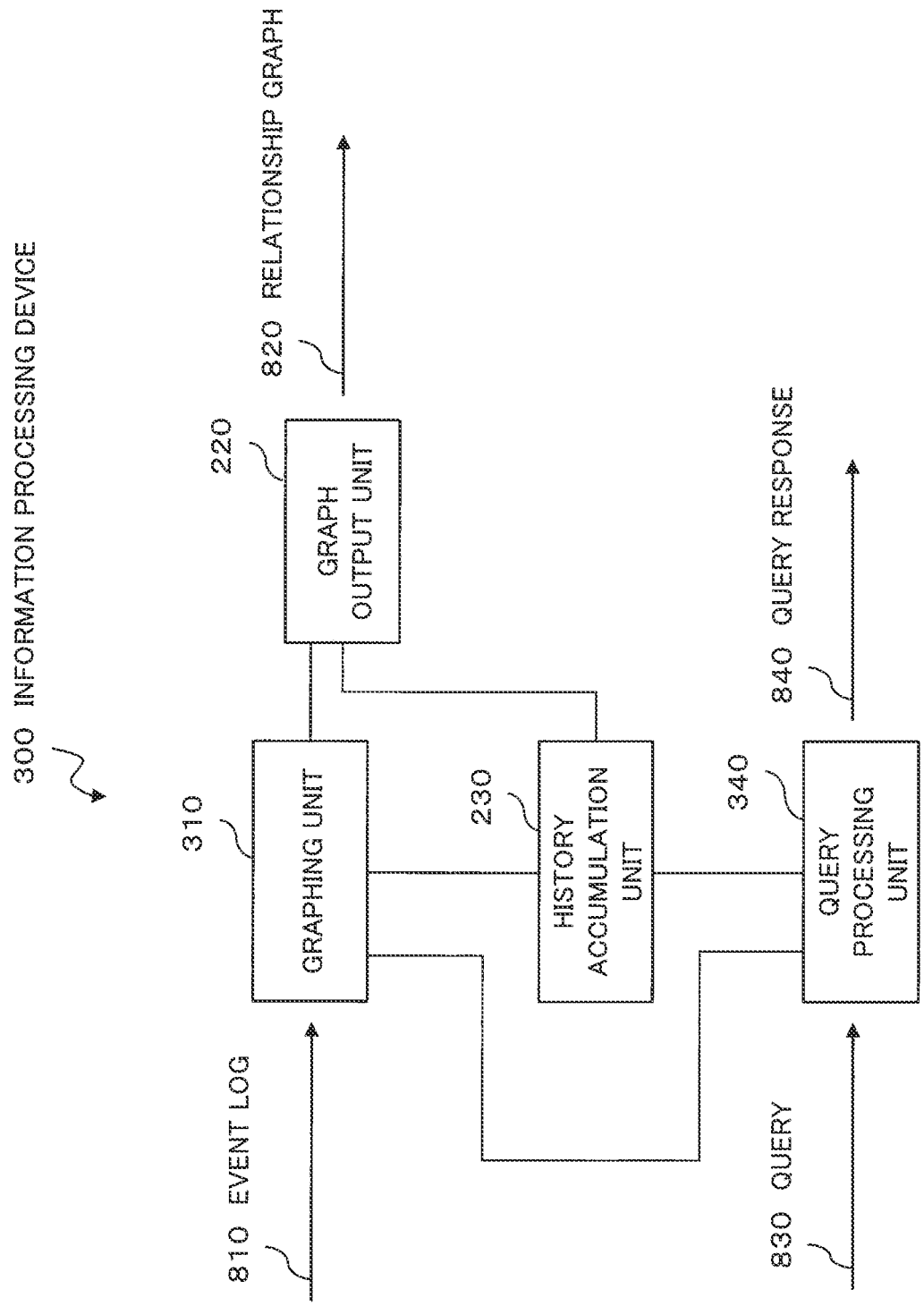
FIG. 13 is a block diagram illustrating a configuration of an information processing device according to a third exemplary embodiment of the present invention.

FIG. 13 is a block diagram illustrating the configuration of an information processing device 300 according to the third exemplary embodiment of the present invention.

The information processing device 300 in the present exemplary embodiment is different from the information processing device 200 in the second exemplary embodiment in that the former includes a graphing unit 310 in place of the graphing unit 210 and further includes a query processing unit 340, as illustrated in FIG. 13.

===Graphing Unit 310===

The graphing unit 310 further outputs a generated relationship graph 820 to the query processing unit 340. The graphing unit 310 is equivalent to the graphing unit 210 illustrated in FIG. 12 except for the aforementioned respect.

===Query Processing Unit 340===

The query processing unit 340 receives a query 830 and outputs a query response 840 in response to the query 830.

The query 830 includes arbitrary conditions for, for example, the vertices, sides, and subgraphs of the relationship graph 820. The query 830 may further include conditions for the time of day associated with a relationship graph 820 stored in a history accumulation unit 230 and generated or updated by the graphing unit 310.

The query processing unit 340 retrieves the history accumulation unit 230 by using the conditions as keys, and the graphing unit 310 confirms a relationship graph 820 to be generated or updated and detects, for example, vertices, sides, and subgraphs of the relationship graph 820 that satisfy the conditions. The query processing unit 340 outputs a query response 840 including the relationship graph 820 and the presence or absence and number of vertices, sides, and subgraphs of the relationship graph 820 which are freely selected based on the detection result.

For example, the query processing unit 340 outputs the query response 840 via the output unit 705 illustrated in FIG. 8. The query processing unit 340 may further send the query response 840 to a device (not illustrated) via the communication unit 706 illustrated in FIG. 8. The query processing unit 340 may even record the query response 840 on the recording medium 707 via the storage device 703 illustrated in FIG. 8.

The query processing unit 340 may even store the received query 830, store the query 830, and confirm a relationship graph 820 to be generated or updated by the graphing unit 310 during a predetermined period based on the conditions included in the query 830.

The query processing unit 340 outputs the query response 840 based on the detection result when, for example, the query processing unit 340 detects vertices, sides, and subgraphs of the relationship graph 820 that satisfy the conditions for the first time. Alternatively, the query processing unit 340 may continuously detect vertices, sides, and subgraphs of the relationship graph 820 that satisfy the conditions and output the query response 840 based on the detection result.

As described above, when the query processing unit 340 stores the query 830 and the graphing unit 310 retrieves a relationship graph 820 to be generated or updated, the information processing device 300 may include no history accumulation unit 230.

When the query processing unit 340 excludes a relationship graph 820 to be generated or updated by the graphing unit 310 as a target for the query 830, the graphing unit 310 may output no relationship graph 820 to the query processing unit 340. In other words, in this case, the graphing unit 310 may be equivalent to the graphing unit 210.

The query processing unit 340 may be applied to the information processing device 100 illustrated in FIG. 1. In this case, the query processing unit 340 executes the above-mentioned operation for, for example, a relationship graph 820 to be generated or updated by the graphing unit 110.

As an effect in the above-mentioned present exemplary embodiment, information including the data transmission relationship between elements constituting an information processing system, and more appropriately indicating the state of the information processing system may be output, in addition to the effect of the second exemplary embodiment.

This is because the query processing unit 340 outputs a query response 840 including information concerning the relationship graph 820 that satisfies the conditions included in the query 830.

<<<Exemplary Modification to Third Exemplary Embodiment>>>

Figure 23:
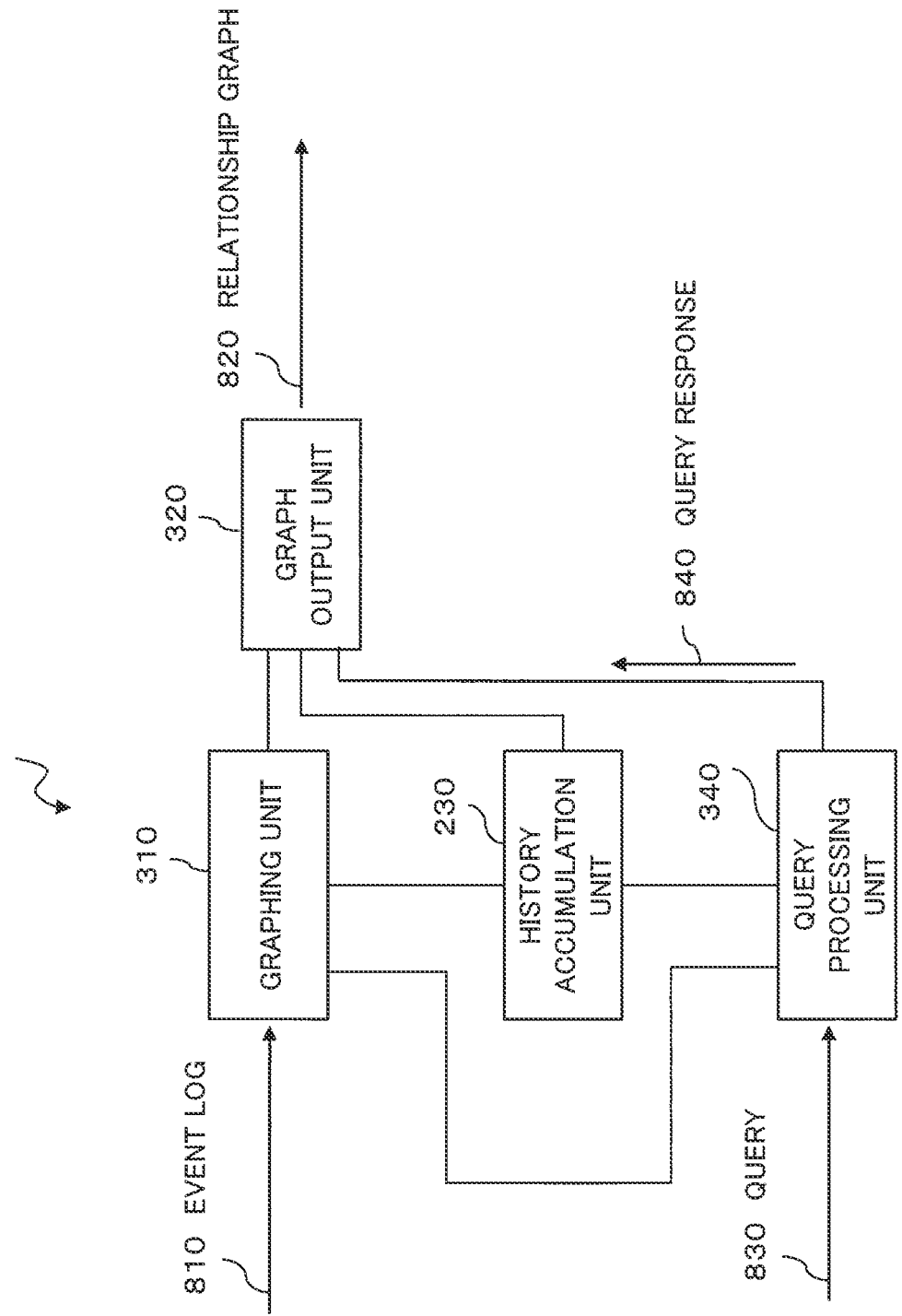
FIG. 23 is a block diagram illustrating the configuration of an information processing device according to an exemplary modification to the third exemplary embodiment.

FIG. 23 is a block diagram illustrating the configuration of an information processing device 301 according to the present exemplary modification.

The information processing device 301 according to the present exemplary modification is different from the information processing device 300 in that in the former the query response 840 is input to the graph output unit 320, as illustrated in FIG. 23.

The graph output unit 320 superimposes the information of the query response 840 to the query 830 on the relationship graph 820 which is output from the graphing unit 310 and the history accumulation unit 230, and outputs the obtained information.

Assume, for example, that a query 830 "when Send occurs from a node P3 to a node P2, notify to that effect" is input as a query, and an event similar to that illustrated in FIG. 11 occurs. Then, the graphing unit 310 generates a relationship graph 820 based on the event, outputs it to the graph output unit 320, and further outputs it to the query processing unit 340.

The query processing unit 340 searches for the relationship graph 820 based on the query 830 and outputs the detected information (in this case, "Send from the node P3 to the node P2") to the graph output unit 320.

The graph output unit 320 superimposes the relationship graph 820 and the detected information on each other and outputs the relationship graph 820 superimposed with the detected information to, for example, a display.

Figure 24:
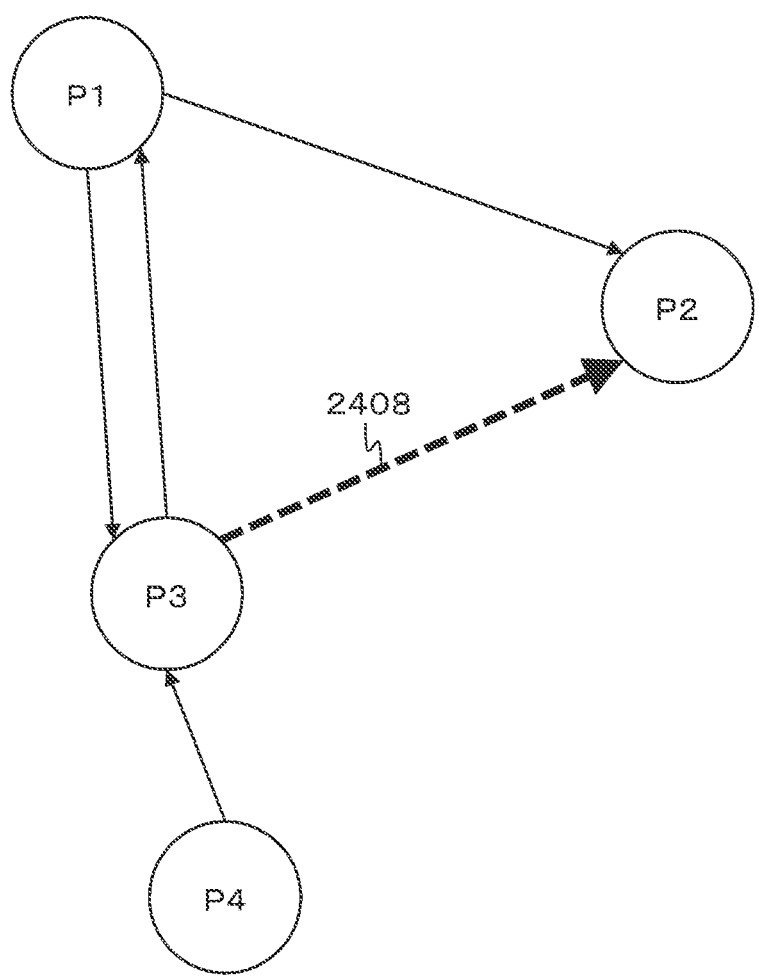
FIG. 24 is a view illustrating an exemplary relationship graph on which detected information is superimposed in the exemplary modification to the third exemplary embodiment.

FIG. 24 is a view illustrating an example of a network diagram relationship graph 2425 (relationship graph 820) superimposed with the detected information. When any query 830 is unavailable, the output is as illustrated in FIG. 7. However, when a query 830 is available, as in the present exemplary embodiment, an edge 2408 indicating Send from P3 to P2 is highlighted, as illustrated in FIG. 24. The highlighting method may be, for example, display in a color different from those of other edges, blinking, display with a change in type of line (thickness or pattern), or animation, but this method is not limited to such specific examples.

As an effect in the above-mentioned present exemplary modification, the position of a portion matching the query in the entire relationship graph 820 may be recognizable at a glance.

This is because the query processing unit 340 outputs information concerning a relationship graph 820 corresponding to the query 830, and the graph output unit 320 outputs the relationship graph 820 superimposed with the information.

Fourth Exemplary Embodiment

A fourth exemplary embodiment of the present invention will be described in detail below with reference to the drawings. A description of details which are the same as in the foregoing description will be omitted hereinafter within the range in which an explanation of the present exemplary embodiment does not become unclear.

Figure 14:
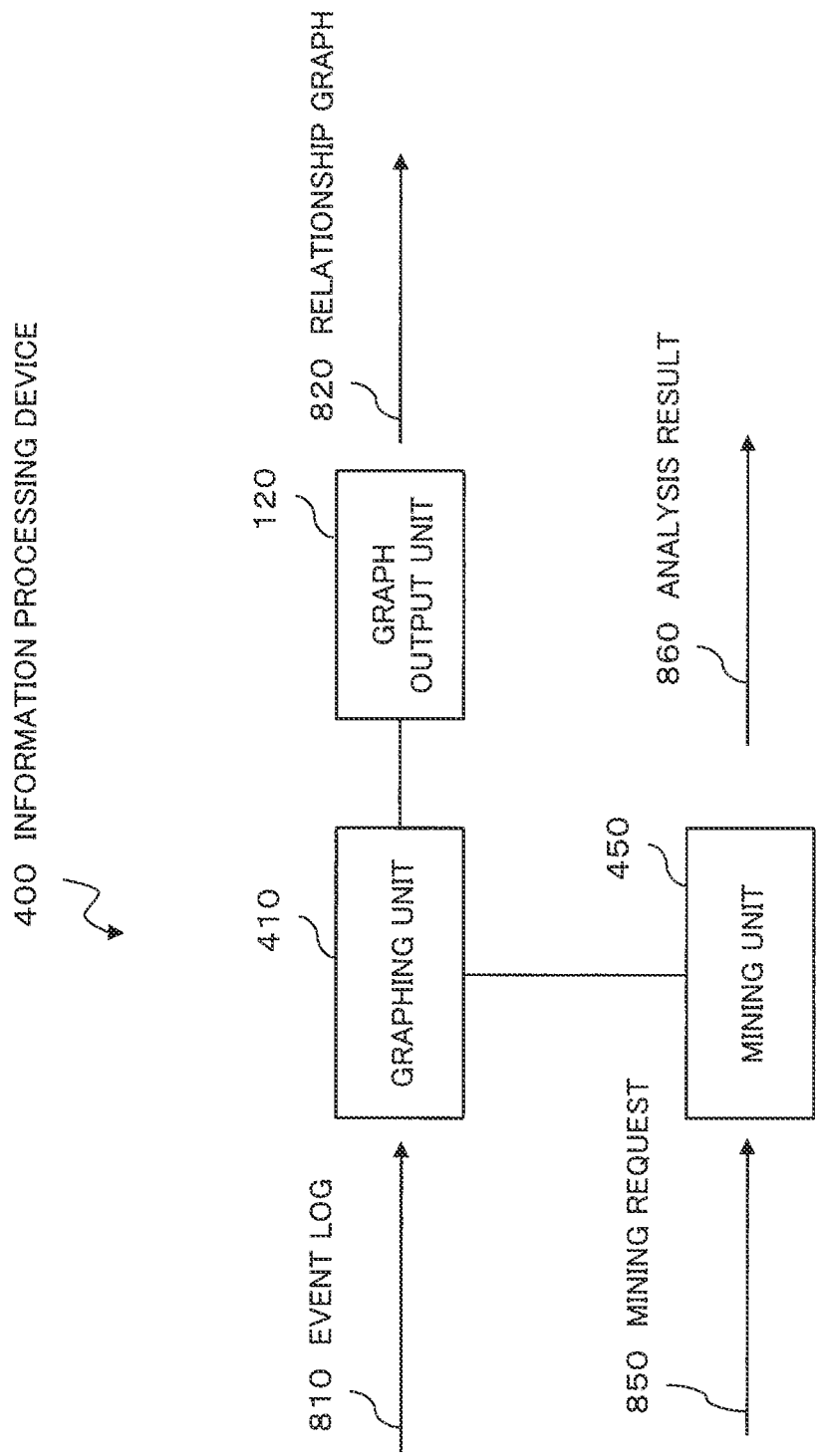
FIG. 14 is a block diagram illustrating a configuration of an information processing device according to a fourth exemplary embodiment of the present invention.

FIG. 14 is a block diagram illustrating the configuration of an information processing device 400 according to the fourth exemplary embodiment of the present invention.

The information processing device 400 in the present exemplary embodiment is different from the information processing device 100 in the first exemplary embodiment in that the former includes a graphing unit 410 in place of the graphing unit 110 and further includes a mining unit 450, as illustrated in FIG. 14.

===Graphing Unit 410===

The graphing unit 410 further outputs a generated relationship graph 820 to the mining unit 450. The graphing unit 410 is equivalent to the graphing unit 110 illustrated in FIG. 1 except for the aforementioned respect.

===Mining Unit 450===

The mining unit 450 receives a mining request 850. The mining unit 450 executes analysis (mining) for the relationship graph 820 received from the graphing unit 410 based on the mining request 850. The mining unit 450 sends, as a response to the mining request 850, an analysis result 860 which is obtained as a result of the analysis.

The mining request 850 designates details of analysis executed for the relationship graph 820. Examples of the details of analysis include graph clustering, frequently-appearing pattern detection, and betweenness centrality.

Graph clustering is analysis for dividing the vertices of the relationship graph 820 into "communities." For example, the vertices of the relationship graph 820 are divided into "communities" such that sides are densely populated between vertices belonging to the same communities and sparsely populated between vertices that do not belong to the same communities.

Frequently-appearing pattern detection is analysis for detecting patterns of subgraphs frequently appearing in the relationship graph 820. For example, subgraph patterns appearing at the first to k-th highest frequencies are extracted.

Betweenness centrality is analysis for obtaining the number of times each vertex is positioned midway on the shortest routes for all pairs of vertices. For example, the number of times corresponding to each vertex is counted.

The mining request 850 may designate details of arbitrary mining (also called graph mining, graph structure mining, or graph structure analysis) without limitation to the above-mentioned examples.

The mining unit 450 executes mining for the relationship graph 820 generated by the graphing unit 410 based on details of analysis included in the mining request 850. The mining unit 450 outputs the mining execution result as the analysis result 860.

For example, the mining unit 450 outputs the analysis result 860 via the output unit 705 illustrated in FIG. 8. The mining unit 450 may further send the analysis result 860 to a device (not illustrated) via the communication unit 706 illustrated in FIG. 8. The mining unit 450 may even record the analysis result 860 on the recording medium 707 via the storage device 703 illustrated in FIG. 8.

The mining unit 450 may be applied to the information processing device 200 illustrated in FIG. 2. In this case, the mining unit 450 may similarly execute the above-mentioned operation for the relationship graph 820 stored in the history accumulation unit 230.

As an effect in the above-mentioned present exemplary embodiment, information more appropriately indicating the state of an information processing system, which includes the data transmission relationship between elements constituting the information processing system, may be output, in addition to the effect of the first exemplary embodiment.

This is because the mining unit 450 analyzes (mines) the relationship graph 820 based on details of analysis included in the mining request 850 and outputs the result as an analysis result 860.

<<<First Exemplary Modification to Fourth Exemplary Embodiment>>>

The technique according to the exemplary modification to the third exemplary embodiment may be applied to the fourth exemplary embodiment.

In other words, the analysis result 860 output from the mining unit 450 in the present exemplary modification may be input to the graph output unit 120 in the present exemplary modification. The graph output unit 120 in the present exemplary modification superimposes the information of the analysis result 860 on the relationship graph 820 output from the graphing unit 410 and outputs the obtained information.

As an effect in the above-mentioned present exemplary modification, the position of a portion matching the mining request 850 in the entire relationship graph 820 may be recognizable at a glance.

This is because the mining unit 450 outputs information concerning a relationship graph 820 corresponding to the mining request 850, and the graph output unit 120 outputs the relationship graph 820 superimposed with the information.

<<<Second Exemplary Modification to Fourth Exemplary Embodiment>>>

FIG. 25 is a block diagram illustrating the configuration of an information processing device 401 according to the present exemplary modification.

As a feature of the present exemplary modification, the current and past relationship graphs 820 are analyzed individually and the respective analysis results are compared with each other to detect the difference in network state from the usual state.

The information processing device 401 according to the present exemplary modification includes a history accumulation unit 430, a second mining unit 451, a comparison unit 460, and a graph output unit 420, as well as a graphing unit 410 and a first mining unit 450, as illustrated in FIG. 25.

The graphing unit 410 according to the present exemplary modification outputs the generated relationship graph 820 to the history accumulation unit 430 and the mining unit 450.

The history accumulation unit 430 according to the present exemplary modification is equivalent to the history accumulation unit 230 illustrated in FIG. 12 except that the former may be accessed even by the mining unit 451.

The first mining unit 450 receives a relationship graph 820 (current relationship graph 820) from the graphing unit 410 and analyzes the current relationship graph 820.

The second mining unit 451 receives a relationship graph 820 (past relationship graph 820) from the history accumulation unit 430 and analyzes the past relationship graph 820.

The comparison unit 460 compares the analysis results obtained by the first mining unit 450 and the second mining unit 451 with each other, extracts their difference, and outputs the difference.

The graph output unit 420 superimposes the difference on the relationship graph 820 and outputs the obtained relation graph 820. For example, the graph output unit 420 outputs the relationship graph 820 with its portion corresponding to the difference being highlighted in the current relationship graph 820 from the graphing unit 410 or the past relationship graph 820 from the history accumulation unit 430.

As an effect in the above-mentioned present exemplary modification, a portion of the current relationship graph 820 statistically different from the past relationship graph 820, that is, a relationship graph portion different from the usual one may be visually obviously discriminable.

This is because the following configuration is incorporated. First, each of the mining units 450 and 451 analyzes the relationship graphs 820 respectively received from the graphing unit 410 and the history accumulation unit 430. Second, the comparison unit 460 extracts the difference between the analysis results obtained by each of the mining units 450 and 451. Third, the graph output unit 420 displays the relationship graph 820 further based on the difference.

Fifth Exemplary Embodiment

A fifth exemplary embodiment of the present invention will be described in detail below with reference to the drawings. A description of details which are the same as in the foregoing description will be omitted hereinafter within the range in which an explanation of the present exemplary embodiment does not become unclear.

Figure 15:
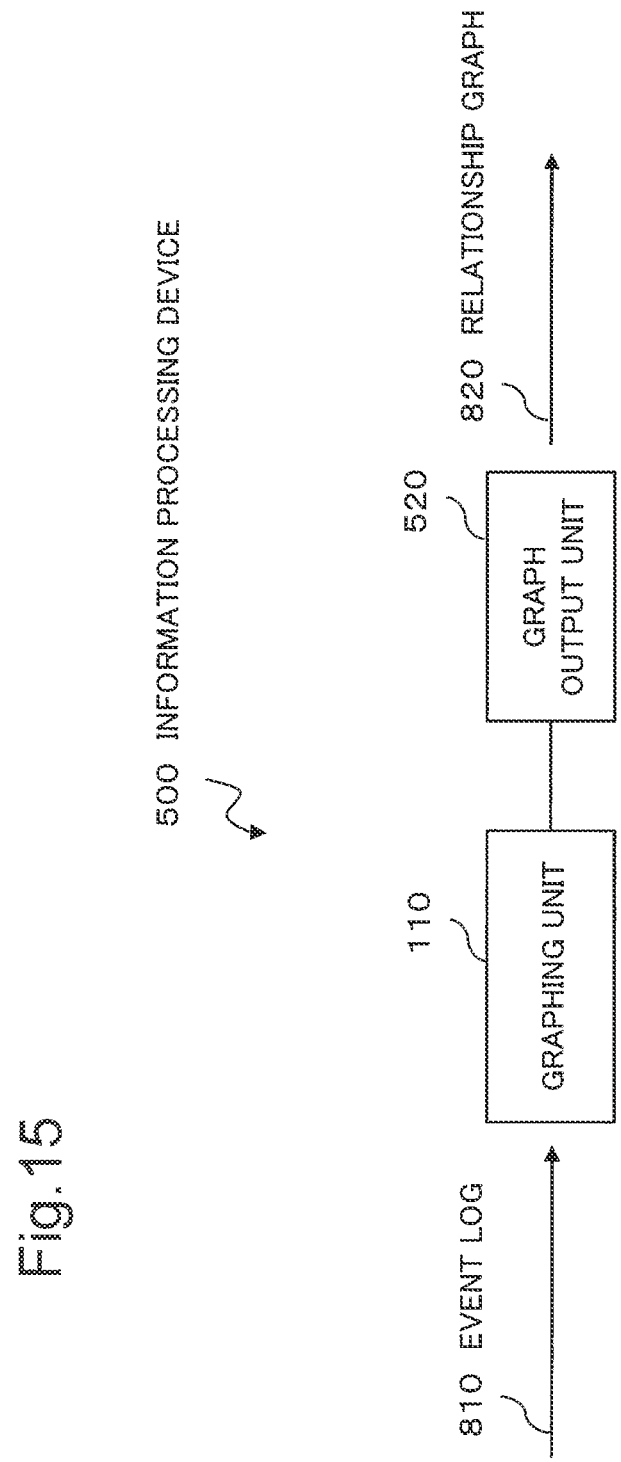
FIG. 15 is a block diagram illustrating a configuration of an information processing device according to a fifth exemplary embodiment of the present invention.

FIG. 15 is a block diagram illustrating the configuration of an information processing device 500 according to the fifth exemplary embodiment of the present invention.

The information processing device 500 in the present exemplary embodiment is different from the information processing device 100 in the first exemplary embodiment in that the former includes a graph output unit 520 in place of the graph output unit 120, as illustrated in FIG. 15.

===Graph Output Unit 520===

The graph output unit 520 generates and outputs a relationship graph 820 represented in a diagram. The graph output unit 520 is equivalent to the graph output unit 120 illustrated in FIG. 1 except for the aforementioned respect.

Examples of the diagram include a network diagram and a matrix. An example of the relationship graph 820 represented in a diagram will be described below.

Figure 16:
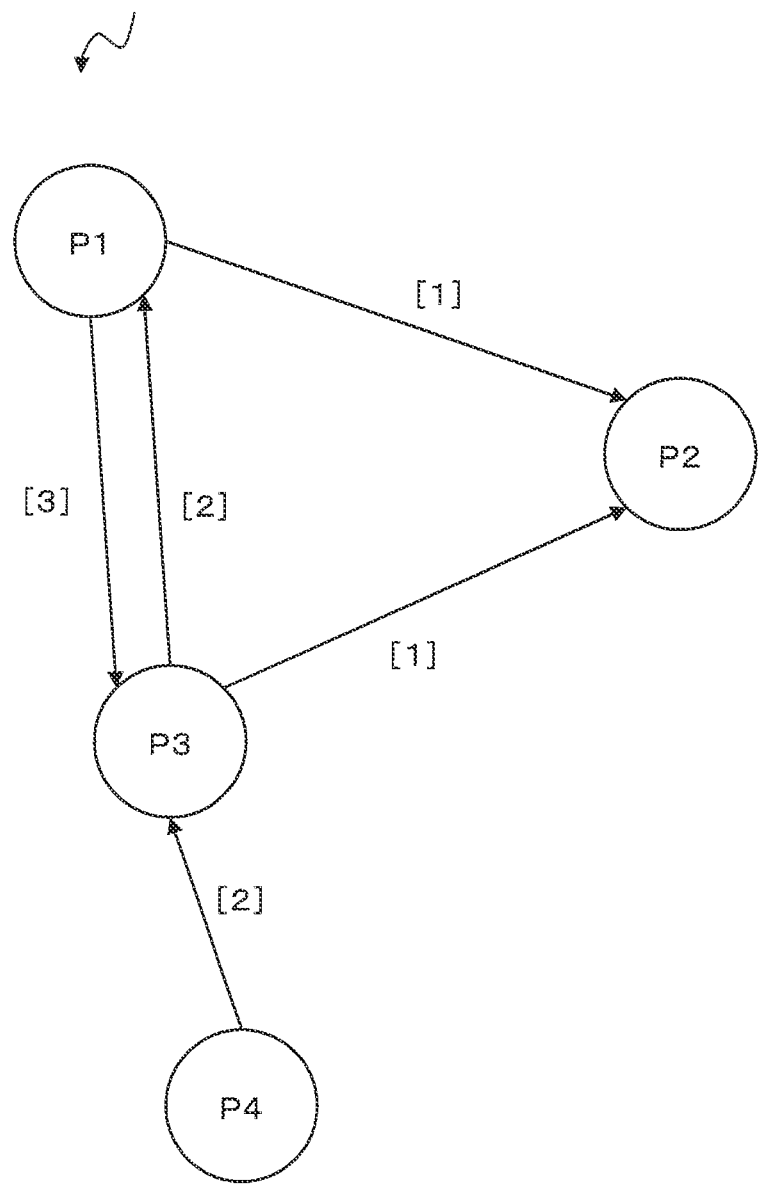
FIG. 16 is a view illustrating an exemplary network diagram relationship graph in the fifth exemplary embodiment.

FIG. 16 is a view illustrating a network diagram relationship graph 825 as a specific example of the relationship graph 820 represented in a network diagram, corresponding to the relationship graph 823 illustrated in FIG. 11.

Referring to FIG. 16, circles represent vertices and character strings marked within the circles represent the vertex identifiers. Line segments which connect the circles to each other represent sides. A character string (for example, [1]) added to each side represents an attribute for the side.

Figure 17:
FIG. 17 is a view illustrating an exemplary matrix relationship graph in the fifth exemplary embodiment.

FIG. 17 is a view illustrating a matrix relationship graph 826 as a specific example of the relationship graph 820 represented in a matrix, corresponding to the relationship graph 823 illustrated in FIG. 11.

FIG. 17 illustrates a matrix having vertices specified by a list of vertex identifiers on the vertical axis (leftmost vertex identifiers) as its FROM (start)-side vertices of the sides, and vertices specified by a list of vertex identifiers on the horizontal axis (vertex identifiers on the top row) as its TO (end)-side vertices of the sides. Numerical values (for example, "1") in the cells of the matrix represent the numbers of accesses from the FROM-side vertices to the TO-side vertices.

Figure 18:
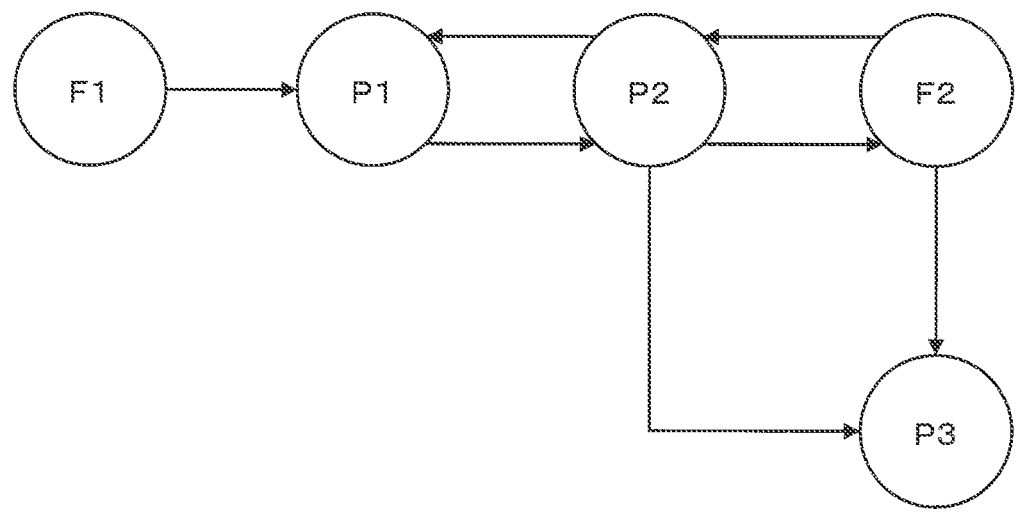
FIG. 18 is a view illustrating another exemplary network diagram relationship graph in the fifth exemplary embodiment.

FIG. 18 is a view illustrating a network diagram relationship graph 827 as a specific example of the relationship graph 820 represented in a network diagram, corresponding to the relationship graph 824 illustrated in FIG. 6.

Referring to FIG. 18, circles represent vertices and character strings marked within the circles represent vertex identifiers. Line segments which connect the circles to each other represent sides.

Figure 19:
FIG. 19 is a view illustrating another exemplary matrix relationship graph in the fifth exemplary embodiment.

FIG. 19 is a view illustrating a matrix relationship graph 828 as a specific example of the relationship graph 820 represented in a matrix, corresponding to the relationship graph 824 illustrated in FIG. 6.

FIG. 19 is a view illustrating a matrix having vertices specified by a list of vertex identifiers on the vertical axis (leftmost vertex identifiers) as its FROM-side (request-side) vertices of the sides, and vertices specified by a list of vertex identifiers on the horizontal axis (vertex identifiers on the top row) as its TO-side (standby-side) vertices of the sides. Character strings (for example, "READ") in the cells of the matrix represent the presence or absence (NL: the absence of sides, others: the presence of sides) of sides from the FROM-side vertices to the TO-side vertices or attributes (L0, L1, and L2).

The matrix may be of an arbitrary type without limitation to the example illustrated in FIG. 19. The network diagram may also be of an arbitrary type without limitation to the example illustrated in FIG. 18. The graph output unit 520 may output relationship graphs 820 represented in arbitrary types of diagrams, freely in combination or independently, without limitation to the above-mentioned example.

The graph output unit 520 may be applied to the information processing device 200 illustrated in FIG. 12. In this case, the graph output unit 520 may similarly generate and output a relationship graph 820 represented in a diagram, for the relationship graph 820 stored in the history accumulation unit 230.

Similarly, the technique disclosed in the present exemplary embodiment may be applied to the information processing device 200 illustrated in FIG. 13, the information processing device 400 illustrated in FIG. 14, the information processing device 301 illustrated in FIG. 23, and the information processing device 401 illustrated in FIG. 25.

<<<Exemplary Modification to Fifth Exemplary Embodiment>>>

The graph output unit 520 may output display information indicating a temporal change in relationship graph 820.

The display information may be, for example, information indicating a moving image of a change in state of the relationship graph 820. The display information may further be information indicating a particular arrangement of the states of the relationship graph 820 available at a plurality of points in time.

The display information may be updated in real time in association with the current time. When the graph output unit 520 is applied to the information processing device 200, the display information may be associated with the required time range.

As an effect in the above-mentioned present exemplary embodiment, a relationship graph 820 may be provided in a form easier for the user to recognize, in addition to the effect of the first exemplary embodiment.

This is because the graph output unit 520 generates and outputs a relationship graph 820 represented in a diagram. Note also that the graph output unit 520 outputs display information indicating a temporal change in relationship graph 820.

Although the present invention has been described above with reference to each exemplary embodiment, the present invention is not limited to the above-described exemplary embodiments. Various changes which would be understood by those skilled in the art may be made to the configurations or details of the present invention within the scope of the present invention.

This application claims priority based on Japanese Patent Application No. 2014-058496 filed on Mar. 20, 2014 and PCT International Application No. PCT/JP2014/003014 filed on Jun. 6, 2014, the disclosure of which is incorporated herein by reference in their entirety.

INDUSTRIAL APPLICABILITY

The present invention is applicable to an information processing device which performs, for example, configuration management, operational management, and security management of an information processing system, a monitoring method, and a program therefor.

REFERENCE SIGNS LIST

100 information processing device
110 graphing unit
120 graph output unit
200 information processing device
210 graphing unit
220 graph output unit
230 history accumulation unit
300 information processing device
301 information processing device
310 graphing unit
320 graph output unit
340 query processing unit
400 information processing device
401 information processing device
410 graphing unit
420 graph output unit
430 history accumulation unit
450 mining unit
451 mining unit
460 comparison unit 500 information processing device
520 graph output unit
700 computer
701 CPU
702 storage unit
703 storage device
704 input unit
705 output unit
706 communication unit
707 recording medium
810 event log
811 event log
820 relationship graph
821 relationship graph
822 relationship graph
823 relationship graph
824 relationship graph
825 network diagram relationship graph
826 matrix relationship graph
827 network diagram relationship graph
828 matrix relationship graph
830 query
840 query response
850 mining request
860 analysis result
900 system to be monitored
901 system to be monitored
910 host
911 host
920 process
930 event monitoring means
931 process generation monitoring means
932 file access monitoring means
933 intra-host interprocess communication monitoring means
934 inter-host interprocess communication monitoring means
940 arbitrary device
941 router
942 sensor
943 printer
944 network device
2001 database
2002 timer
2003 graph information aggregation/reduction unit
2004 cache
2408 edge
2425 network diagram relationship graph

The invention claimed is:

1. An information processing device comprising:
a storage embodying a program; and
a processor configured to read the program and execute the program to:
acquire an event log from a host computer in a system, the event log indicating a behavior of each of a plurality of processes operating in the system and a behavior of each of a plurality of predetermined devices in the system;
generate a first relationship graph based on the event log, the first relationship graph including the plurality of processes and predetermined devices as vertices thereof and including data transmission relationships between the vertices as sides thereof, wherein the data transmission relationships include a plurality of data transmissions in a same direction that are set as a single side of the sides, and wherein the generation of the first relationship graph includes a side aggregating the event log indicating a similar behavior, and wherein a criterion for determining whether a new event is normal or abnormal when the new event occurs is calculated based on the first relationship graph;
generate a second relationship graph that includes vertices reflecting an arbitrary file and a device accessed by the plurality of processes, and sides reflecting accesses;
delete a specific side of the sides when an event corresponding to the specific side has not occurred for a predetermined period; and
output the first and the second relationship graphs.

2. The information processing device according to claim 1, wherein
the system includes a plurality of hosts which are connected to each other via a network and in which each arbitrary process of the processes operates, and
the processor is further configured to at least obtain the event log from a monitoring agent located in each of the hosts.

3. The information processing device according to claim 1, wherein the processor is further configured to generate a relationship graph that includes vertices reflecting an arbitrary file and a device accessed by the plurality of processes, and sides reflecting accesses.

4. The information processing device according to claim 1, wherein the processor is further configured to generate the first relationship graph including generation of a new process by the process as a side thereof.

5. The information processing device according to claim 1, wherein the processor is further configured to set information of the similar behavior on the side as an attribute for the side.

6. The information processing device according to claim 1, wherein the processor is further configured to generate the first relationship graph including information concerning a volume of transferred data on the side as an attribute for the side.

7. The information processing device according to claim 1, wherein the processor is further configured to generate the first relationship graph including information concerning the number of accesses on the side as an attribute for the side.

8. The information processing device according to claim 1, wherein the processor is further configured to generate the first relationship graph including types of the data transmission relationships individually as the sides.

9. The information processing device according to claim 1, wherein the processor is further configured to generate the first relationship graph including a combination of the data transmission relationships as a side.

10. The information processing device according to claim 1, wherein the processor is further configured to generate the first relationship graph based on the event log selected based on an arbitrary criterion.

11. The information processing device according to claim 1, wherein the side includes a property associated with a relationship between the vertices.

12. The information processing device according to claim 1, wherein the processor is further configured to:
store the first relationship graph as a history relationship graph,
wherein the processor is configured to output the first relationship graph to be generated by updating the history relationship graph based on the history relationship graph and the event log.

13. The information processing device according to claim 12, wherein the processor is further configured to delete the history relationship graph based on elapse of time.

14. The information processing device according to claim 13, wherein the processor is further configured to stochastically delete the history relationship graph when the history relationship graph is deleted.

15. The information processing device according to claim 13, wherein when the history relationship graph is deleted, the processor is configured to aggregate information included in the history relationship graph to be deleted with the history relationship graph that is not to be deleted.

16. The information processing device according to claim 1, the processor further configured to:
receive a query including one or more retrieval conditions and send information concerning the first relationship graph that matches one or more of the one or more retrieval conditions.

17. The information processing device according to claim 16, wherein the processor is configured to highlight
a portion of the first relationship graph which matches with the one or more retrieval conditions.

18. The information processing device according to claim 1, the processor further configured to:
analyze the first relationship graph based on a mining request and output a result of the analysis.

19. The information processing device according to claim 18, wherein the processor is further configured to output the result of the analysis, and highlight a portion of the first relationship graph corresponding to the mining request.

20. The information processing device according to claim 18, wherein the processor is configured to analyze a current relationship graph and output a result of the analysis of the current relationship graph, and
the processor is further
configured to analyze a past relationship graph and output a result of the analysis of the past relationship graph; and
compare the result of the analysis of the current relationship graph and the result of the analysis of the past relationship graph with each other, based on one mining request of the mining request, and output a difference based on a result of the comparison.

21. The information processing device according to claim 20, wherein the processor is further configured to
highlight a portion of the relationship graph corresponding to the difference.

22. The information processing device according to claim 17, wherein the processor is further configured to highlight the portion by using at least one of display in a different color, blinking, a different line thickness, a different line pattern, and animation.

23. The information processing device according to claim 1, wherein the processor is configured to generate and output the first relationship graph represented in a diagram.

24. An information processing system comprising:
a processor configured
according to claim 1; and
wherein the processor is further configured to monitor an event of at least one of process generation, file access, and interprocess communication.

25. A monitoring method comprising:
acquiring an event log from a host computer in a system, the event log indicating a behavior of each of a plurality of processes operating in the system and a behavior of each of a plurality of predetermined devices in the system;
generating a first relationship graph based on the event log, the first relationship graph including the plurality of processes and predetermined devices as vertices thereof and including data transmission relationships between the vertices as sides thereof, wherein the data transmission relationships include a plurality of data transmissions in a same direction that are set as a single side of the sides, and wherein the generation of the first relationship graph includes a side aggregating the event log indicating a similar behavior, and wherein a criterion for determining whether a new event is normal or abnormal when the new event occurs is calculated based on the first relationship graph;
generating a second relationship graph that includes vertices reflecting an arbitrary file and a device accessed by the plurality of processes, and sides reflecting accesses;
deleting a specific sides of the sides when an event corresponding to the specific side has not occurred for a predetermined period; and
outputting the relationship graph.

26. A non-volatile, non-transitory computer-readable recording medium recording a program for causing a computer to execute the processes of:
acquiring an event log from a host computer in a system, the event log indicating a behavior of each of a plurality of processes operating in the system and a behavior of each of a plurality of predetermined devices in the system;
generating a first relationship graph based on the event log, the first relationship graph including the plurality of processes and predetermined devices as vertices thereof and including data transmission relationships between the vertices as sides thereof, wherein the data transmission relationships include a plurality of data transmissions in a same direction that are set as a single side of the sides, and wherein the generation of the first relationship graph includes a side aggregating the event log indicating a similar behavior, and wherein a criterion for determining whether a new event is normal or abnormal when the new event occurs is calculated based on the first relationship graph;
generating a second relationship graph that includes vertices reflecting an arbitrary file and a device accessed by the plurality of processes, and sides reflecting accesses;
deleting a specific side of the sides when an event corresponding to the specific side has not occurred for a predetermined period; and
outputting the first and the second relationship graphs.

* * * * *